US00RE47112E

(19) United States
(12) Reissued Patent
Pomerantz et al.

(10) Patent Number: US RE47,112 E
(45) Date of Reissued Patent: Nov. 6, 2018

(54) METHOD AND SYSTEM FOR PRINTING GRAPHICAL CONTENT ONTO A PLURALITY OF MEMORY DEVICES AND FOR PROVIDING A VISUALLY DISTINGUISHABLE MEMORY DEVICE

(71) Applicant: SanDisk IL Ltd., Kfar Saba (IL)

(72) Inventors: Itzhak Pomerantz, Kfar Saba (IL); Rahav Yairi, Oranit (IL); Gad Ponte, Palo Alto, CA (US)

(73) Assignee: SanDisk IL Ltd., Kfar Saba (IL)

(21) Appl. No.: 14/803,904

(22) Filed: Jul. 20, 2015

Related U.S. Patent Documents

Reissue of:
(64) Patent No.: 8,690,283
Issued: Apr. 8, 2014
Appl. No.: 12/897,451
Filed: Oct. 4, 2010

U.S. Applications:
(60) Provisional application No. 61/253,271, filed on Oct. 20, 2009.

(51) Int. Cl.
*B41J 29/38* (2006.01)
*B41J 2/045* (2006.01)

(52) U.S. Cl.
CPC ..... *B41J 2/04545* (2013.01); *B41J 2/04535* (2013.01); *B41J 2/04536* (2013.01)

(58) Field of Classification Search
CPC .... B41J 29/38; B41J 2/04503; B41J 2/04545; B41J 2/04535; B41J 2/04536
(Continued)

(56) References Cited

U.S. PATENT DOCUMENTS 3,688,088 A 8/1972 Brown et al.
D257,345 S 10/1980 Levy
(Continued)

FOREIGN PATENT DOCUMENTS

CN 1342116 A 3/2002
FR 2691105 11/1993
(Continued)

OTHER PUBLICATIONS

Search Report and Written Opinion for PCT Application No. PCT/US2010/052637, dated Dec. 17, 2010, 9 pages.
(Continued)

*Primary Examiner* — Tuan H Nguyen
(74) *Attorney, Agent, or Firm* — Brinks, Gilson & Lione

(57) ABSTRACT

A method and system for printing graphical content onto a plurality of memory devices and for providing a visually distinguishable memory device are provided. In one embodiment, graphical content to be printed onto a plurality of memory devices is identified. A graphical image is then created from the identified graphical content, wherein the graphical image comprises a plurality of sub-areas, wherein each sub-area contains graphical content and corresponds to at least one memory device of the plurality of memory devices. The graphical image is then printed onto the plurality of memory devices, wherein the plurality of memory devices are positioned to substantially correspond with positions of the plurality of sub-areas in the graphical image. Other embodiments are disclosed.

32 Claims, 33 Drawing Sheets

(58) Field of Classification Search
USPC ..... 347/14; 358/1.18; 382/284
See application file for complete search history.

(56) References Cited

U.S. PATENT DOCUMENTS

| | | | |
|---|---|---|---|
| D267,714 | S | 1/1983 | Tajima et al. |
| 4,432,419 | A | 2/1984 | Streich |
| D276,400 | S | 11/1984 | Daenen et al. |
| 4,485,421 | A | 11/1984 | Hoshino |
| 4,532,419 | A | 7/1985 | Takeda |
| 4,581,716 | A | 4/1986 | Kamiya |
| D298,326 | S | 11/1988 | Kimura |
| D298,327 | S | 11/1988 | Kimura |
| D299,475 | S | 1/1989 | Munnik |
| D305,886 | S | 2/1990 | Banjo et al. |
| 4,901,193 | A | 2/1990 | Kinugawa et al. |
| 4,924,076 | A | 5/1990 | Kitamura |
| D311,391 | S | 10/1990 | Ueshin et al. |
| 5,155,663 | A | 10/1992 | Harase |
| 5,173,841 | A | 12/1992 | Uenaka et al. |
| 5,244,840 | A | 9/1993 | Kodai et al. |
| D350,115 | S | 8/1994 | Iftikar et al. |
| D364,399 | S | 11/1995 | Long |
| D369,156 | S | 4/1996 | Ohmori et al. |
| D369,157 | S | 4/1996 | Ohmori et al. |
| 5,546,278 | A | 8/1996 | Bethurum |
| 5,556,108 | A | 9/1996 | Nagano et al. |
| D375,941 | S | 11/1996 | Kerklaan |
| 5,617,297 | A | 4/1997 | Lo et al. |
| 5,627,729 | A | 5/1997 | Oldendorf et al. |
| 5,655,917 | A | 8/1997 | Kaneshige et al. |
| 5,716,221 | A | 2/1998 | Kanter |
| 5,747,735 | A | 5/1998 | Chang et al. |
| 5,752,857 | A | 5/1998 | Knights |
| D401,403 | S | 11/1998 | Schreiber |
| 5,833,473 | A | 11/1998 | Betker et al. |
| 5,847,932 | A | 12/1998 | Kanter |
| D405,441 | S | 2/1999 | Saito et al. |
| 5,868,338 | A | 2/1999 | Martin et al. |
| D406,861 | S | 3/1999 | Leedy, Jr. |
| 5,890,016 | A | 3/1999 | Tso |
| D408,054 | S | 4/1999 | Leedy, Jr. |
| D410,913 | S | 6/1999 | Saito et al. |
| 5,940,275 | A | 8/1999 | Laity |
| D415,132 | S | 10/1999 | Homma et al. |
| 5,964,595 | A | 10/1999 | Centofante |
| 6,040,622 | A | 3/2000 | Wallace |
| D427,168 | S | 6/2000 | Iwasaki |
| 6,075,709 | A | 6/2000 | Yang |
| 6,097,605 | A | 8/2000 | Klatt et al. |
| 6,108,209 | A | 8/2000 | Cox et al. |
| D434,040 | S | 11/2000 | Yasufuku et al. |
| D434,042 | S | 11/2000 | Yasufuku et al. |
| D437,323 | S | 2/2001 | Sugino et al. |
| D438,562 | S | 3/2001 | Webb et al. |
| D438,563 | S | 3/2001 | Webb et al. |
| 6,201,295 | B1 | 3/2001 | Iwasaki |
| 6,219,256 | B1 | 4/2001 | Wu |
| D444,060 | S | 6/2001 | Elsener et al. |
| D445,111 | S | 7/2001 | Okamoto et al. |
| D445,797 | S | 7/2001 | Lee et al. |
| D446,525 | S | 8/2001 | Okamoto et al. |
| D449,078 | S | 10/2001 | Fujita |
| D449,619 | S | 10/2001 | Iwasaki et al. |
| D452,243 | S | 12/2001 | Wallace |
| D452,244 | S | 12/2001 | Wallace et al. |
| D452,246 | S | 12/2001 | Wallace et al. |
| D452,281 | S | 12/2001 | Ohno |
| D452,690 | S | 1/2002 | Wallace et al. |
| D452,691 | S | 1/2002 | Iwasaki et al. |
| D452,864 | S | 1/2002 | Wallace et al. |
| D452,865 | S | 1/2002 | Wallace et al. |
| D453,934 | S | 2/2002 | Wallace et al. |
| 6,362,957 | B1 | 3/2002 | Iwasaki |
| 6,381,143 | B1 | 4/2002 | Nakamura |
| D459,355 | S | 6/2002 | Shimoda et al. |
| 6,399,906 | B1 | 6/2002 | Sato et al. |
| D460,456 | S | 7/2002 | Shimoda et al. |
| 6,433,285 | B2 | 8/2002 | Maeda et al. |
| 6,444,501 | B1 | 9/2002 | Bolken |
| D464,355 | S | 10/2002 | Burke |
| 6,457,647 | B1 | 10/2002 | Kurihashi et al. |
| 6,480,390 | B2 | 11/2002 | Matsumiya et al. |
| 6,483,038 | B2 | 11/2002 | Lee et al. |
| D467,586 | S | 12/2002 | Shimoda et al. |
| 6,490,667 | B1 | 12/2002 | Ikeda |
| 6,501,163 | B1 | 12/2002 | Utsumi |
| D469,777 | S | 2/2003 | Burke |
| 6,539,623 | B1 | 4/2003 | Chen |
| 6,540,560 | B1 | 4/2003 | Ito et al. |
| D474,473 | S | 5/2003 | Fischer et al. |
| D476,011 | S | 6/2003 | Taniguchi et al. |
| 6,573,567 | B1 | 6/2003 | Nishizawa et al. |
| 6,580,615 | B1 | 6/2003 | Nakanishi et al. |
| D478,358 | S | 8/2003 | Ashida |
| D479,393 | S | 9/2003 | Weitzman |
| 6,617,673 | B2 | 9/2003 | Lee et al. |
| D481,068 | S | 10/2003 | Blossom et al. |
| 6,632,997 | B2 | 10/2003 | Hoffman |
| 6,646,885 | B1 | 11/2003 | Yu et al. |
| 6,655,972 | B2 | 12/2003 | Sato |
| D486,331 | S | 2/2004 | Boron |
| 6,692,268 | B2 | 2/2004 | Kung et al. |
| 6,699,053 | B2 | 3/2004 | Kuroda |
| D488,476 | S | 4/2004 | Yu et al. |
| D488,477 | S | 4/2004 | Yu et al. |
| D489,385 | S | 5/2004 | Lin |
| D491,951 | S | 6/2004 | Yu et al. |
| 6,751,694 | B2 | 6/2004 | Liu et al. |
| D492,686 | S | 7/2004 | Yu et al. |
| D492,687 | S | 7/2004 | Yu et al. |
| 6,764,346 | B2 | 7/2004 | Fujita et al. |
| D493,798 | S | 8/2004 | Yu et al. |
| D493,799 | S | 8/2004 | Chiang et al. |
| 6,774,469 | B2 | 8/2004 | Utsumi |
| D498,760 | S | 11/2004 | Chiang et al. |
| 6,820,148 | B1 | 11/2004 | Cedar et al. |
| 6,834,810 | B2 | 12/2004 | Maruyama |
| 6,890,113 | B2 * | 5/2005 | Block ..... B41J 3/4075 400/61 |
| 6,903,935 | B1 | 6/2005 | Chen |
| 6,908,038 | B1 | 6/2005 | Le |
| 6,910,635 | B1 | 6/2005 | Miks et al. |
| 6,922,343 | B2 | 7/2005 | Nakanishi et al. |
| 6,928,302 | B1 | 8/2005 | Kinney et al. |
| 6,939,182 | B1 | 9/2005 | Wen et al. |
| D510,935 | S | 10/2005 | Yamada et al. |
| 6,954,293 | B2 | 10/2005 | Heckenkamp et al. |
| 6,970,359 | B2 | 11/2005 | Gochnour et al. |
| 6,979,227 | B2 | 12/2005 | Ikeda |
| 6,981,068 | B1 | 12/2005 | Harari et al. |
| D516,076 | S | 2/2006 | Ko |
| D517,559 | S | 3/2006 | Yu et al. |
| 7,009,846 | B1 | 3/2006 | Wang et al. |
| 7,011,251 | B1 | 3/2006 | Miks et al. |
| 7,030,316 | B2 | 4/2006 | Centofante |
| 7,033,221 | B2 | 4/2006 | Bricaud et al. |
| D522,099 | S | 5/2006 | Fritz |
| 7,052,295 | B1 | 5/2006 | Lin |
| D523,435 | S | 6/2006 | Takiar et al. |
| 7,059,871 | B1 | 6/2006 | Hsiao |
| D525,248 | S | 7/2006 | Takiar |
| D525,623 | S | 7/2006 | Takiar et al. |
| D525,978 | S | 8/2006 | Takiar et al. |
| 7,094,633 | B2 | 8/2006 | Takiar |
| 7,107,378 | B1 | 9/2006 | Brewer et al. |
| 7,112,074 | B2 | 9/2006 | Nakai et al. |
| D530,343 | S | 10/2006 | Maruyama et al. |
| D530,741 | S | 10/2006 | Blossom |
| D531,181 | S | 10/2006 | Cuellar et al. |
| 7,133,149 | B2 | 11/2006 | Keane et al. |
| 7,137,011 | B1 | 11/2006 | Harari et al. |
| D533,556 | S | 12/2006 | Yamada et al. |
| D537,081 | S | 2/2007 | Takiar et al. |

(56) References Cited

U.S. PATENT DOCUMENTS

| | | | | |
|---|---|---|---|---|
| 7,179,129 | B1 | 2/2007 | Hwang | |
| D537,824 | S | 3/2007 | Day et al. | |
| D538,286 | S | 3/2007 | Takiar et al. | |
| 7,193,161 | B1 | 3/2007 | Takiar et al. | |
| D542,420 | S | 5/2007 | Racenscroft | |
| 7,220,915 | B1 | 5/2007 | Park et al. | |
| D546,896 | S | 7/2007 | Ibuki | |
| D547,727 | S | 7/2007 | Sasaki | |
| D552,002 | S | 10/2007 | Eisler | |
| D552,098 | S | 10/2007 | Nishizawa et al. | |
| D552,099 | S | 10/2007 | Nishizawa et al. | |
| D552,612 | S | 10/2007 | Nishizawa et al. | |
| D554,123 | S | 10/2007 | Day et al. | |
| 7,286,257 | B1 * | 10/2007 | Morgavi | 358/1.18 |
| 7,291,903 | B2 | 11/2007 | Nishizawa et al. | |
| D556,764 | S | 12/2007 | Nishizawa et al. | |
| 7,303,127 | B2 | 12/2007 | Brewer et al. | |
| 7,306,160 | B2 | 12/2007 | Takiar et al. | |
| 7,306,161 | B2 | 12/2007 | Takiar et al. | |
| 7,307,848 | B2 | 12/2007 | Takiar | |
| D560,717 | S | 1/2008 | Robertson et al. | |
| 7,324,347 | B2 | 1/2008 | Nakanishi et al. | |
| 7,335,034 | B1 | 2/2008 | Liu | |
| 7,336,498 | B2 | 2/2008 | Takiar et al. | |
| D568,151 | S | 5/2008 | Moffat et al. | |
| 7,371,119 | B1 | 5/2008 | Lee | |
| 7,374,104 | B2 | 5/2008 | Aoki et al. | |
| 7,393,246 | B2 | 7/2008 | Chi | |
| 7,410,376 | B2 | 8/2008 | Ying et al. | |
| 7,416,132 | B2 | 8/2008 | Takiar et al. | |
| 7,427,032 | B2 | 9/2008 | Osako et al. | |
| D579,044 | S | 10/2008 | Lasch et al. | |
| 7,440,285 | B2 | 10/2008 | Centofante | |
| 7,443,690 | B2 | 10/2008 | Matsumoto et al. | |
| D579,940 | S | 11/2008 | Pepin | |
| D581,932 | S | 12/2008 | Nishizawa et al. | |
| 7,458,519 | B2 | 12/2008 | Aoki et al. | |
| D584,769 | S | 1/2009 | Hammad | |
| D585,448 | S | 1/2009 | Kawaguchi et al. | |
| D588,598 | S | 3/2009 | Nakamura | |
| D591,752 | S | 5/2009 | Aoki | |
| D591,754 | S | 5/2009 | Hwangbo et al. | |
| D593,600 | S | 6/2009 | Lasch et al. | |
| 7,547,234 | B2 | 6/2009 | Wallace | |
| D596,007 | S | 7/2009 | Price et al. | |
| 7,607,221 | B2 | 10/2009 | Centofante | |
| D607,885 | S | 1/2010 | Otani et al. | |
| 7,669,773 | B2 | 3/2010 | Nishizawa et al. | |
| 7,719,845 | B1 | 5/2010 | Jang et al. | |
| 8,346,015 | B2 * | 1/2013 | Tanaka | H04N 1/3873 345/619 |
| 2001/0036524 | A1 * | 11/2001 | Anderson | B32B 7/06 428/40.1 |
| 2002/0066790 | A1 | 6/2002 | Cocco | |
| 2003/0048605 | A1 | 3/2003 | Kyozuka et al. | |
| 2003/0075609 | A1 | 4/2003 | Kim | |
| 2003/0109179 | A1 | 6/2003 | Kaneshiro et al. | |
| 2003/0162445 | A1 | 8/2003 | Fujita et al. | |
| 2004/0062109 | A1 | 4/2004 | Wallace | |
| 2004/0064619 | A1 | 4/2004 | Liu et al. | |
| 2004/0087213 | A1 | 5/2004 | Kao | |
| 2004/0089717 | A1 | 5/2004 | Harari et al. | |
| 2004/0090829 | A1 | 5/2004 | Miura et al. | |
| 2004/0229511 | A1 | 11/2004 | Chen | |
| 2005/0011671 | A1 | 1/2005 | Takiar et al. | |
| 2005/0021909 | A1 | 1/2005 | Much et al. | |
| 2005/0037671 | A1 | 2/2005 | Yamada et al. | |
| 2005/0105360 | A1 | 5/2005 | Takiar et al. | |
| 2005/0111280 | A1 | 5/2005 | Takiar et al. | |
| 2005/0148217 | A1 | 7/2005 | Takiar et al. | |
| 2005/0253239 | A1 | 11/2005 | Nishizawa et al. | |
| 2006/0003609 | A1 | 1/2006 | Hwang | |
| 2006/0014434 | A1 | 1/2006 | Yamamoto et al. | |
| 2006/0194479 | A1 | 8/2006 | Osako et al. | |
| 2006/0261173 | A1 * | 11/2006 | Chen | 235/492 |
| 2008/0252323 | A1 | 10/2008 | Hopkins et al. | |
| 2009/0090782 | A1 | 4/2009 | May | |
| 2010/0042245 | A1 * | 2/2010 | Chou et al. | 700/110 |

FOREIGN PATENT DOCUMENTS

| | | | |
|---|---|---|---|
| JP | H08-282056 | A | 10/1996 |
| JP | H11-58712 | A | 3/1999 |
| JP | 2003/196629 | | 7/2003 |
| JP | 2005-352790 | | 12/2005 |
| JP | 2006-142643 | | 6/2006 |
| JP | 2008-045344 | A | 2/2008 |
| JP | 2009-205309 | A | 9/2009 |
| WO | WO 2007/067790 | | 6/2007 |
| WO | WO 2007/067802 | | 6/2007 |

OTHER PUBLICATIONS

Office Action for U.S. Appl. No. 29/345,635, dated Jan. 4, 2011, 5 pages.

Office Action for U.S. Appl. No. 29/345,641, dated Jan. 4, 2011, 5 pages.

Office Action for U.S. Appl. No. 12/897,451 dated Jun. 28, 2013, 10 pages.

Notice of Allowance for U.S. Appl. No. 12/897,451 dated Dec. 3, 2013, 9 pages.

English language translation of Office Action and Search Report in Chinese Patent Application Serial No. 201510441651.9, dated Sep. 7, 6 pages.

English language translation of Office Action in Korean Patent Application Serial No. 10-2012-7011486, dated Sep. 30, 2016, 6 pages.

English language translation of Office Action and Search Report in Chinese Patent Application Serial No. 201510441651.9, dated Apr. 25, 2016, 6 pages.

Notice of Allowance for U.S. Appl. No. 29/359,216, dated Nov. 26, 2010, 12 pages.

Office Action for U.S. Appl. No. 29/345,643, dated Apr. 1, 2010, 4 pages.

Office Action for U.S. Appl. No. 29/345,643, dated Jun. 8, 2010, 5 pages.

Office Action for U.S. Appl. No. 29/345,635, dated Jun. 11, 2010, 6 pages.

Office Action for U.S. Appl. No. 29/345,641, dated Jun. 11, 2010, 8 pages.

"Micro SD Card Product Specification, Version 1.0," TwinMOS Technologies Inc., http://www.sparkfun.com/datasheets/Prototyping/microSD_Spec.pdf, 13 pages, 2001.

"MiniSD Secure Digital Card, Specification," Double Top Technology (DTT) Limited, http://www.dtt8.com/images/minisd%20specification.pdf, 11 pages 2006.

"Elecom Evil 2GB MicroSD Card," http://www.geekstuff4u.com/accessories/storage/elecom-evil-2gb-microsd-card.html, 2 pages, 2008.

Photographs of Elecom Evil 2GB MicroSD Card, 7 pages 2009.

"MicroSD," http://en.wikipedia.org/wiki/Microsd, 3 pages 2009.

"SanDisk 2.0 GB SD card," 1 page, 2009.

"SanDisk gruvi micro SD card of the Rolling Stones 'A Bigger Bang'," http://www.manifest-tech.com/images/consumer_elec/flash_media/rs_big_bang.jpg, 1 page, 2006.

"SanDisk Receives CES Innovations Design Award for Its Gruvi Rolling Stones Card," http://www.dexinger.com/design_news/4840.html, Feb. 20, 2006, 3 pages.

"ImagesNest RIP 2.0," http://www.bluecubit.com, 2007-2009, 2 pages.

"MicroSD Memory Card with a Semi-Transparent Color Surfaces," Design U.S. Appl. No. 29/345,641, filed Oct. 20, 2009, inventors: Itzhak Pomerantz and Robert C. Miller.

"MicroSD Memory Card with Colored Grip", Design U.S. Appl. No. 29/345,643, filed Oct. 20, 2009, inventor: Itzhak Pomerantz.

Office Action for U.S. Appl. No. 29/345,635, dated Aug. 9, 2011, 8 pages.

Office Action for U.S. Appl. No. 29/345,641, dated Aug. 16, 2011, 9 pages.

(56) References Cited

OTHER PUBLICATIONS

Office Action for U.S. Appl. No. 29/345,643, dated Aug. 9, 2011, 8 pages.
"MicroSD Memory Card with Different Color Surfaces", Design U.S. Appl. No. 29/345,635, filed Oct. 20, 2009, inventors: Itzhak Pomerantz and Robert C. Miller.
Notice of Allowance for U.S. Appl. No. 29/359,213, dated Sep. 16, 2010, 10 pages.
Office Action for U.S. Appl. No. 29/345,643, dated Feb. 24, 2011, 5 pages.
Notice of Allowance for U.S. Appl. No. 29/359,216, 12 pages, Nov. 26, 2010.
Office Action for U.S. Appl. No. 29/345,635, dated Sep. 25, 2012, 7 pages.
Office Action for U.S. Appl. No. 29/345,641, dated Sep. 25, 2012, 7 pages.
Office Action for U.S. Appl. No. 29/345,643, dated Sep. 25, 2012, 7 pages.
Notice of Allowance for U.S. Appl. No. 29/359,216, dated Mar. 21, 2011, 5 pages.

* cited by examiner

METHOD AND SYSTEM FOR PRINTING GRAPHICAL CONTENT ONTO A PLURALITY OF MEMORY DEVICES AND FOR PROVIDING A VISUALLY DISTINGUISHABLE MEMORY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 8,690,283, which* claims the benefit of U.S. Provisional Application No. 61/253,271, filed Oct. 20, 2009, which is hereby incorporated by reference.

BACKGROUND

Many memory devices, such as memory cards, have indicia on them to indicate the manufacturer of the memory device and its internal characteristics, such as its storage capacity. For some memory cards, such as some SD cards, the indicia is printed on a label, which is applied to the card during the manufacturing process. For other memory cards, such as some microSD cards and other memory cards where the presence of a label can result in an unacceptable overall card thickness, the indicia is printed directed onto the card during the manufacturing process. For example, during manufacturing, microSD cards can be molded together as a strip of cards and later separated into individual cards. While the cards are still together in the strip, the indicia can be printed onto the cards as a group using a pad printing process. In this process, the indicia for each of the cards is placed on a printing plate. The indicia is then transferred from the printing plate onto a silicone pad, and the silicone pad is pressed against the strip of memory cards. The memory cards are later separated from the strip. While pad printing adds less thickness to a memory card as compared to a label, pad printing generally cannot provide the rich graphical content that can be provided by a label.

SUMMARY

Embodiments of the present invention are defined by the claims, and nothing in this section should be taken as a limitation on those claims.

By way of introduction, the embodiments described below generally relate to a method and system for printing graphical content onto a plurality of memory devices and for providing a visually distinguishable memory device. In one embodiment, graphical content to be printed onto a plurality of memory devices is identified. A graphical image is then created from the identified graphical content, wherein the graphical image comprises a plurality of sub-areas, wherein each sub-area contains graphical content and corresponds to at least one memory device of the plurality of memory devices. The graphical image is then printed onto the plurality of memory devices, wherein the plurality of memory devices are positioned to substantially correspond with positions of the plurality of sub-areas in the graphical image.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Introduction

Figure 1:
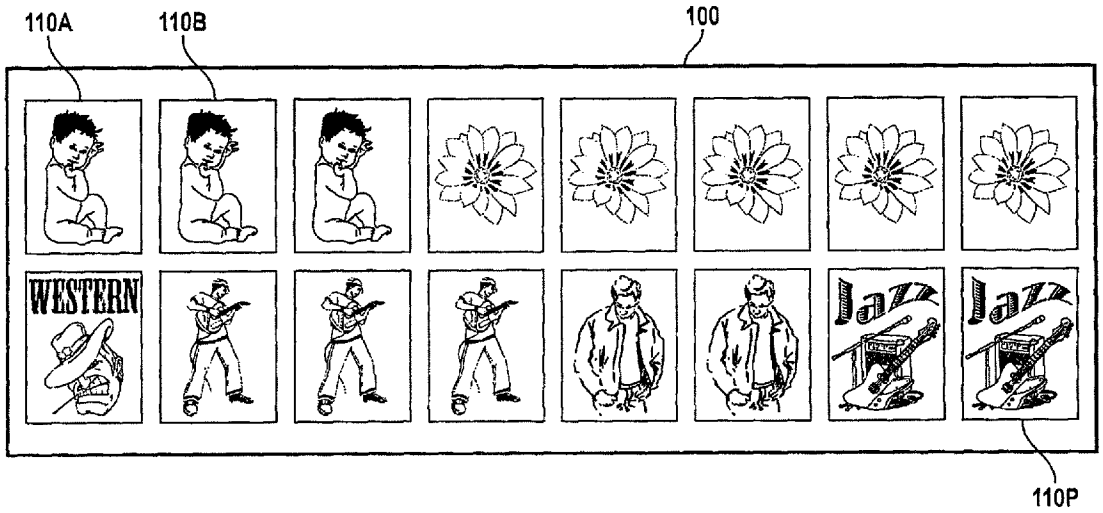
FIG. 1 is an illustration of graphical content and a graphical image of an embodiment.

The following embodiments provide a method and system for printing graphical content onto a plurality of memory devices and for providing a visually distinguishable memory device. As used herein, a "memory device" refers to any device that comprises a memory operative to store information. Examples of memory devices include, but are not limited to, handheld, removable memory cards (such as SD or microSD cards), handheld universal serial bus ("USB") flash drives ("UFD"), embedded memory devices, removable or non-removable hard drives (such as solid-state drives), and even "raw" memory chips (i.e., memory chips without a housing). The underlying memory in the memory device can take any suitable form; preferably solid-state memory (e.g., flash), although other types of memory can be used. In some memory devices, in addition to the memory itself, the memory device contains a controller that controls various functionality in the memory device. Also, it should be noted that while a memory device is used to illustrate the printing techniques of these embodiments, these printing techniques can be adapted for use with other items, such as items used in conjunction with memory devices (e.g., memory device readers).

As discussed above, it is often desired for a memory device to include visible indicia that provides information such as, for example, the manufacturer of the memory device and the memory device's internal characteristics, such as its storage capacity. In contrast to the prior methods discussed above that apply a sticker to the memory device or that use a pad printing process to print relatively simple indicia, the method and system disclosed herein provide a mechanism to print more complex indicia and, optionally, to print different graphical content onto one or more memory devices in a batch. Before turning to specific operational examples, the following section provides a general overview of graphical content and graphical images.

Overview of Graphical Content and Graphical Images

As used herein, the term "graphical content" refers to any indicia that can be printed onto a memory device. Examples of"graphical content" include, but are not limited to, pictures, photographs, designs, logos, colors, symbols, text, and any combination thereof. It should be noted that graphical content can include text only and does not necessarily need to include a picture. Graphical content can convey information about an internal characteristic (or "property") of the memory device, such as its storage capacity (e.g., 1 GB, 16 GB, etc.), content stored on the memory device (e.g., audio/video content or software), processing capability (e.g., encryption capability, read/write speeds, etc.), internal hardware configuration (e.g., type of memory cell (one-time programmable or rewritable)), or other built-in features. For example, if the internal characteristic is pre-loaded content, the graphical content can be album art of an album stored in the memory device or poster art of a movie stored in the memory device.

Graphical content can also convey other information. For example, graphical content can be a decorative design or image whose only purpose is to appeal to a certain segment of the market, enticing them to purchase the memory device (e.g., a floral pattern). As another example, graphical content can be an advertisement or other information that is related or unrelated to the memory device itself (e.g., a photo of a product that is being cross-promoted with the memory device, a logo of a company for promotional purposes, etc.). Graphical content may also convey information about digital content to be stored in the memory device, as compared to digital content that is pre-stored in the memory device, to visually assist the user in organizing digital content. For example, some blank memory devices can be sold with a picture of a music note, while other blank memory devices can be sold with a picture of a camera. In this way, if the end user stores music in the "music note" memory device and digital pictures in the "camera" memory device, the end user can quickly and easily identify what is stored on the memory device by merely looking at its outward appearance. Of course, graphical content can also include information that is typically included on stickers or printed using a pad printing process (e.g., the name and/or logo of the manufacturer of the memory device). Graphical content can take many other forms, and a particular form of graphical content should not be read into a claim unless explicitly recited therein. For example, graphical content can be opaque or semitransparent and can include a "blank" area that a user can write on. This blank area can be white or tinted, to serve both as a writing area for a handwritten user label and as a color indication that can help the user recognize the memory card.

It should be noted that graphical content can be printed onto a portion of or the entirety of a memory device face (accordingly, the phrase "printed onto" encompasses both possibilities). For example, in the case of an SD card or a microSD card that has a top surface that is entirety free of exposed electrical contacts and a bottom surface that contains exposed electrical contacts, the graphical content can be printed only onto the top surface of the card (either onto the entirety of the top surface or onto only a part of the top surface (e.g., on the right-hand portion)). This alternative will be discussed in more detail below in conjunction with "keep out" zones.

In these embodiments, instead of printing graphical content onto memory devices on a memory-device-by-memory-device basis, a batch printing process is used, whereby graphical content for a plurality of memory devices is grouped together into a single graphical image and printed onto the plurality of memory devices, as if the plurality of memory devices were a single substrate (e.g., a single piece of paper). This grouping together of graphical content to form a graphical image is referred to herein as "creating a graphical image." Such creation can be done on a computer and can be a manual, automatic, or semi-automatic process. For example, a user can cut-and-paste desired graphical content into a graphical image displayed on a display device, or the computer can automatically position and place the graphical content into the graphical image based on inputted criteria.

As shown in FIG. 1, a graphical image 100 can comprise a plurality of sub-areas 110A, 110B, . . . 110P, where each sub-area 110A, 110B, . . . 110P contains graphical content and corresponds to at least one memory device of the plurality of memory devices. In the embodiment shown in FIG. 1, there is a one-to-one relationship between each sub-area 110A, 110B, . . . 110P of the graphical image 100 and each memory device in the group of memory devices (i.e., each sub-area is exclusively associated with a particular memory device such that there are at least as many sub-areas as there are memory devices). In other embodiments, at least one of the sub-areas is associated with at least two memory devices but less than all of the memory devices. Also, while the sub-areas 110A, 110B, . . . 110P and the graphical content are identically sized in the graphical image 100 of FIG. 1, graphical images in other embodiments have can sub-areas and/or graphical content of varying sizes and shapes (e.g., when printing memory devices of different sizes in a single print batch). Also, it should be noted that the white area shown between the picture and the rectangle perimeter of the sub-areas 110A, 110B, . . . 110P can be a color (white or otherwise) that is part of the image that is printed, or it can be an area that is left unprinted on the memory device.

After it is created from the graphical content, the composite graphical image is sent to a printer (e.g., a flat bed, ink jet printer), which prints the graphical image onto the plurality of memory devices as if they were a single substrate. In this way, graphical content is simultaneously printed onto the plurality of memory devices, as compared to printing the graphical content in a serial fashion, one memory device at a time. Because of the correspondence of image sub-areas to individual memory devices, printing the graphical image onto the plurality of memory devices results in printing respective graphical content onto respective ones of the memory devices. It should be noted that, in the printing process, the printed graphical content can be non-overlapping (i.e., each sub-area is exclusive and contains non-overlapping graphical content relative to another sub-area) or overlapping (i.e., at least one sub-area contains overlapping graphical content relative to at least one other sub-area). Also, as will be described below, when the memory devices are arranged in a tray or are otherwise spaced apart from one another, printing the graphical image onto the plurality of memory devices can result in printing areas in between the memory devices, but the sub-areas are printed to substantially cover corresponding memory devices.

It should be noted that each memory device in a print batch can receive identical graphical content (e.g., for mass production of multiple memory devices with the same graphical content) or at least one memory device in the batch can be identified with different graphical content for customizing the graphical content of one or more memory devices in the batch (e.g., in the graphical image 100 in FIG. 1, six different pieces of graphical content are used for 16 memory cards). The following sections describe an exemplary printing process and various ways for determining what graphical content is to be printed onto one or more memory devices.

Exemplary Printing Process

The following paragraphs provide a description of an exemplary printing process. It should be noted that this process is merely an example and that other printing processes can be used. Accordingly, the details presented herein should not be read into the claims unless explicitly recited therein.

Figure 2:
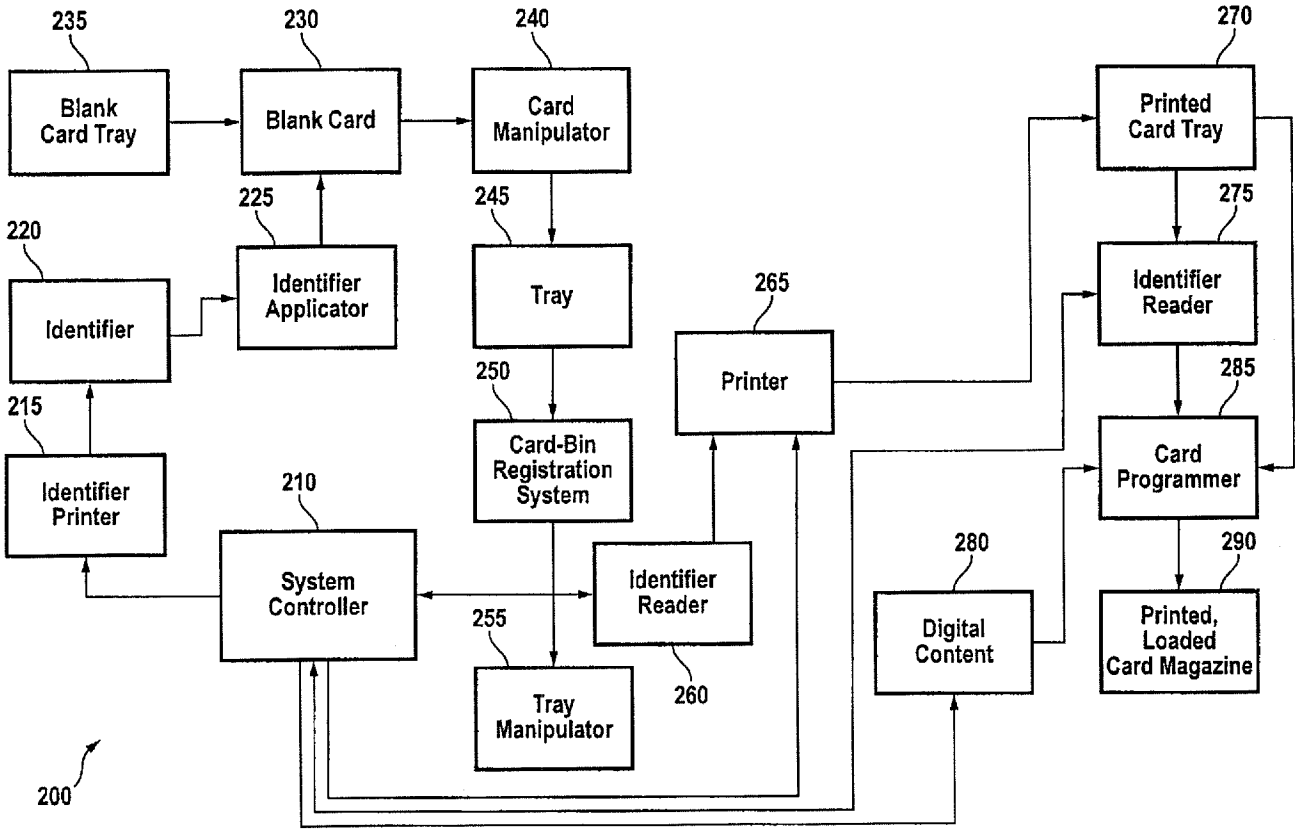
FIG. 2 is a block diagram of a system of an embodiment for printing graphical content onto a plurality of memory devices.

FIG. 2 is a block diagram 200 of a printing system of an embodiment and will be discussed in conjunction with the flow chart 300 of FIG. 3. Central to this system is a system controller 210. The system controller 210 can take any suitable form, such as, but not limited to, a general purpose computer running image processing software and a hardware implementation including logic gates, switches, an application specific integrated circuit (ASIC), a programmable logic controller, and an embedded microcontroller, for example. Accordingly, a computer-readable medium having stored therein computer-readable program code that implements some or all of the acts described herein and in the drawings (e.g., FIG. 3) can be used. The system controller 210 can be a single component or can be distributed over several components.

In this embodiment, the memory devices in a print batch have identical size and shape but at least one memory device in the print batch has a different internal characteristic than the others, and the graphical content to be printed onto each memory device is correlated with the particular internal characteristic of that memory device. Examples of "internal characteristics" include, but are not limited to, storage capacity (e.g., 1 GB, 16 GB, etc.), stored content or content to be stored in the memory device (e.g., audio/video content or pre-loaded software), processing capability (e.g., encryption capability, read/write speeds, etc.), internal hardware configuration (e.g., type of memory cell (one-time programmable or rewritable)), or other built-in features. In this particular illustration, the memory device takes the form of a microSD card, the internal characteristic is audio or video digital content to be stored in the card, and the graphical content is album art or movie poster art associated with the audio or video digital content.

In this embodiment, each memory card in a print batch comprises a respective identifier to indicate the graphical content to be printed onto that memory card. The system controller 210 stores a table or database of identifiers and graphical content (such as Table 1 below) and, using this table/database, selects the appropriate graphical content for each memory card, thereby identifying the graphical content to be printed onto the memory cards.

TABLE 1

| ID | Graphical Content |
|---|---|
| 0001 | albumcover1.jpg |
| 0002 | albumcover2.jpg |
| 0003 | albumcover3.jpg |
| 0004 | movieposter1.jpg |
| 0005 | movieposter2.jpg |

TABLE 1-continued

| ID | Graphical Content |
|---|---|
| 0006 | movieposter3.jpg |
| . . . | . . . |

These identifiers can be used for customized printing of multiple memory cards in one simultaneous print operation. Consider, for example, the situation in which a manufacturer wants to print art work for a Madonna album on 10 memory cards and art work for an Elton John album on 25 memory cards. Instead of printing these memory cards in two separate batches (one for the 10 memory cards to receive the Madonna album art and another for the 25 memory cards to receive the Elton John album art), all 35 memory cards can be placed in a single tray for a single, simultaneous print operation, with the various memory cards each having a respective identifier that identifies which album art to print on the memory card.

An identifier can take any suitable form, including, but not limited to, a bar code, a radio frequency identifier (RFID) tag, a color, a removable sticker, printed information that can be read using optical character recognition (OCR) technology, and data stored within the memory card. In this particular illustration, the identifier takes the form of a bar code sticker that is applied to an external surface of the memory card. Of course, other identifiers can be used, and the appropriate changes can be made to the system 200 in accordance with the particular type of identifier used.

Figure 3:
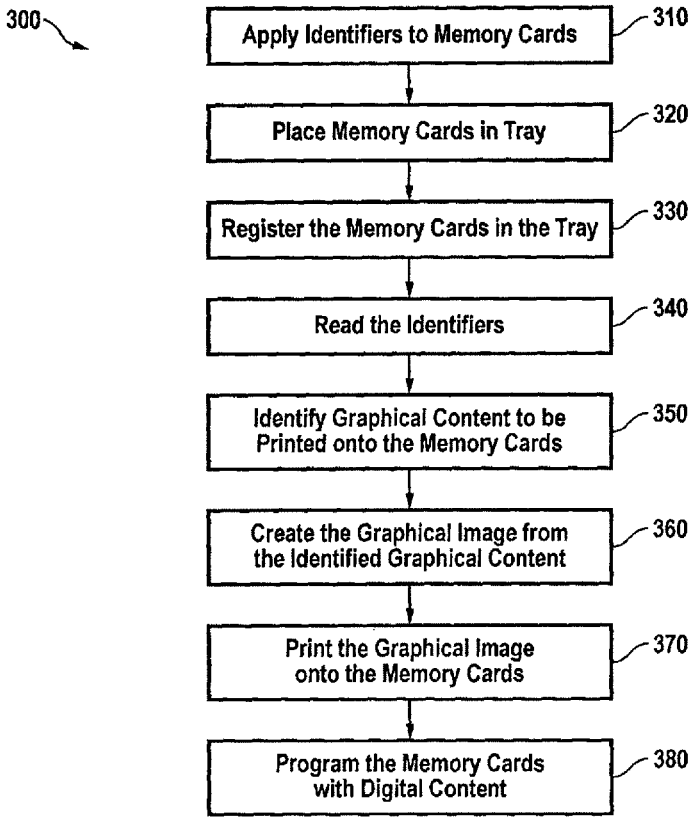
FIG. 3 is a flowchart of a method of an embodiment for printing graphical content onto a plurality of memory devices.

Referring now to FIGS. 2 and 3, in operation, the system controller 210 sends a command to an identifier printer 215 to print a bar code onto each sticker (identifier 220) of a series of stickers. An identifier applicator 225 applies the identifier 220 to a blank card 230 (i.e., a memory card that is not yet loaded with digital content) received from a blank card tray 235 (act 310).

Figure 4A:
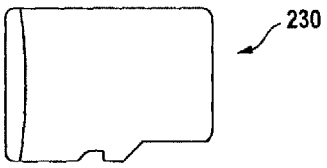
FIGS. 4A and 4B are illustrations of top and bottom surfaces of a memory device of an embodiment.
Figure 4B:
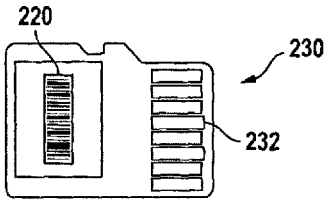

FIGS. 4A and 4B are illustration of top and bottom surfaces of a memory card 230 in this embodiment. As shown in these drawings, the top surface of the memory card 230 (FIG. 4A) has more surface area for receiving graphical content than the bottom surface of the memory card 230 (FIG. 4B), as the bottom surface contains electrical contacts 232 to place the memory card 230 in communication with a host device. In this embodiment, it is desired to print graphical content onto the entire top surface of the memory card 230. Accordingly, the identifier 220 is placed on the bottom surface of the memory card 230 in this embodiment. If graphical content is to be printed only on a portion of the top surface of the memory card 230, there may be enough space on the "non-printed" portion of the top surface for the identifier (e.g., inside the "keep out" zone, as described below). Also, as will be discussed below, in alternate embodiments, the identifier can be placed in other locations on or near the memory card.

Figure 5A:
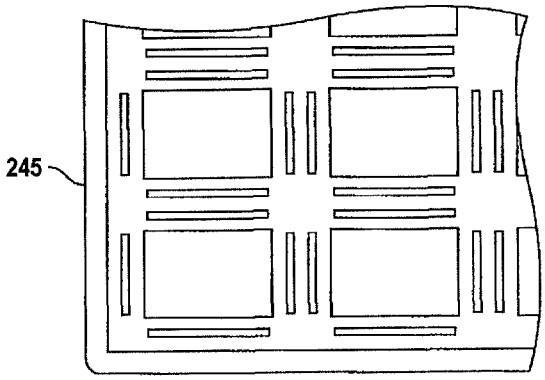
FIGS. 5A, 5B, and 5C are illustrations of a memory device tray of an embodiment.
Figure 5B:
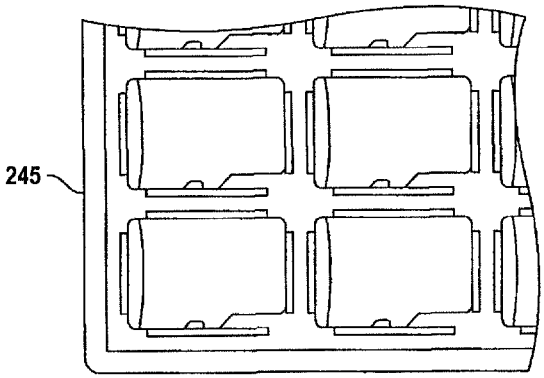
Figure 5C:
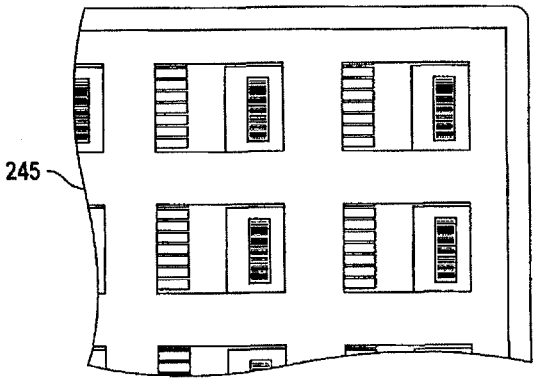
Figure 6:
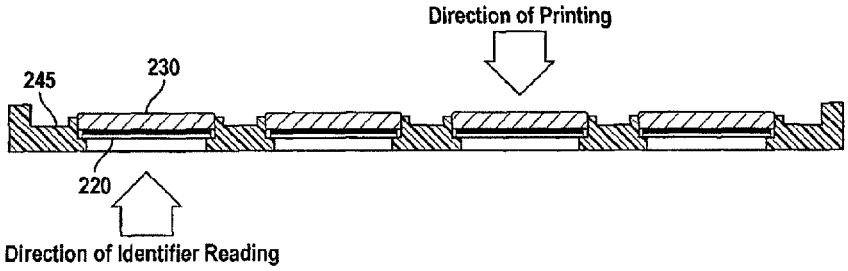
FIG. 6 is an illustration of a printing and identifier reading process of an embodiment.

Returning to FIG. 2, a card manipulator 240 (e.g., a robotic arm) then takes the memory card 230 with the identifier 220 attached to it and places the memory card 230 in a tray 245 (act 320). Because the identifier 220 is on the bottom surface of the memory card 230, it is preferred that the tray 245 have openings through which the identifier 220 can be read. For example, as shown in FIG. 5A, the tray 245 can take the form of a Joint Electron Device Engineering Council ("JEDEC") tray, which is widely used to transport memory cards between various processing stations in a memory device manufacturing facility. Such trays have openings through which robotic arms and other manipulators can lift a memory card from the tray. These openings can be used to read identifiers 220 (and to attach the identifiers 220 to the memory cards). As shown in FIGS. 5B, 5C, and 6, when memory devices are placed in the tray 245, the top surface of the memory devices are exposed on the top surface of the tray 245, and the identifiers 220 on the bottom surfaces of the memory devices are exposed via the openings in the tray 245. In this way, the tray 245 positions the memory devices in the appropriate configuration for both reading the identifiers on the bottom surfaces and for printing graphical content on the top surfaces.

It should be noted that while a JEDEC tray is being used in this illustration, other types of trays can be used. For example, as an alternative to a tray with openings, a tray that has an at least partially transparent floor can be used (e.g., a transparent printing tray or a mesh tray). As another alternative, while FIGS. 5B and 5C show the memory devices being arranged in two dimensions, the memory devices can be arranged in one dimension. As yet another example, if the items to be printed using the printing techniques of these embodiments are not memory devices (e.g., if the items are memory device readers), the tray can be sized appropriately for those items. Further, irrespective of the form of the tray 245, the tray 245 can be reusable (e.g., used to print multiple batches of memory cards over time) or disposable after a single print run, as will be discussed in more detail below.

One issue that may be encountered when using a JEDEC tray or other trays is that bins in the tray for holding memory cards may not hold the memory cards tightly enough for printing purposes. For example, the size of the bins in a JEDEC tray are designed to allow some "slack" in order to allow a robotic arm to more easily grasp a memory card. Because of this slack and because of the shifting that can occur when the tray is handled before it is provided to the printer, not all of the memory cards in the tray 245 may be in the same position for printing, which can result in non-uniform printing of the graphical content onto the memory cards. Further, some forms of graphical content may require specific placement of the memory card, to make sure that the memory card is positioned in such a way to ensure that the graphical content can be printed onto the memory card in its entirety (e.g., to make sure the text is not cut off).

To address these issues, it may be desired to use a card-bin registration system 250 to physically register the memory cards in order to maintain their alignment within the tray 245 (act 330). The card-bin registration system 250 can take any suitable form. For example, the card-bin registration system 250 can be a slanted stand that holds the lowest corner of the tray 245 one to two inches lower that the highest corner. A technician can place the tray 245 on the stand and then manually tap the tray 245 (or a gentle built-in vibrator can be used to apply a directional saw-tooth vibration to the tray) to send all the memory cards to the low corner in their respective bins. Alternatively, the card-bin registration system 250 can take the form of a matching positioning plate with bosses that, when placed on top of the tray 245, position each memory card in place. It should be noted that this act of registering is optional in that, if the tray holds memory cards in a way that is sufficient for printing or if the form of graphical content does not require specific placement of the memory card, the registering act does not need to take place. It should also be noted that, if performed, this act can take place later in the process (e.g., anytime between placement of the memory cards in the tray 245 and printing). Various alternatives to this registration process are described in the following section.

Next, a tray manipulator 255 transports the tray 245 to the printer 265, and, somewhere along this path, an identifier reader 260 (here, a bar code reader) reads the identifiers on each of the memory cards in the tray 245 (act 340). The identifier reader 260 can be a stand-alone device that is positioned in the path to the printer 265, or the identifier reader 260 can be part of the printer 265 itself. The identifier reader 260 scans the bar codes visible from the openings in the bottom of the tray 245 and sends the scanned information back to the system controller 210, which identifies the corresponding graphical content to be printed onto the memory cards by indexing the bar code identifier against the stored table that associates bar code identifiers with desired graphical content (act 350). The identifier reader can also provide the system controller 210 with location information (e.g., x, y coordinates) of the reader at the time it reads the identifier. The system controller 210 can then create a graphical image by assembling the various items of identified graphical content based on their associated location information (act 360). As discussed above, the graphical image can take the form of a file containing instructions readable by the printer 265 for printing the graphical image onto the entire set of memory cards on the tray 245 (e.g., a Photoshop or PowerPoint file converted to a format specific to the printer 265).

Figure 7:
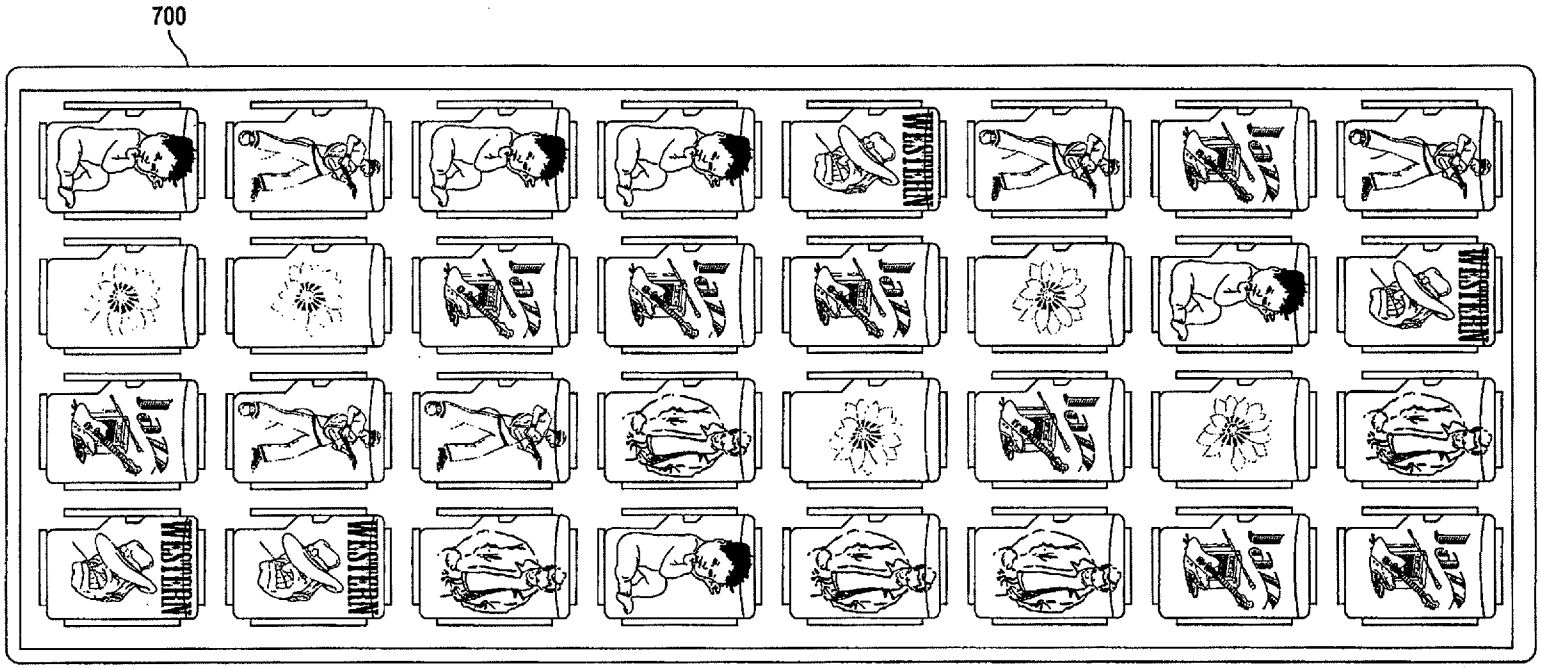
FIG. 7 is an illustration of a tray of memory device of an embodiment after graphical content has been printed onto the memory devices.
Figure 9:
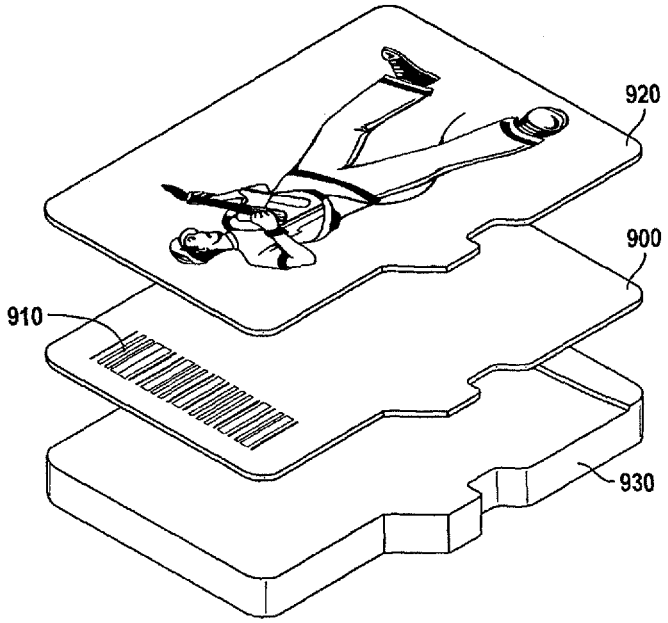
FIG. 9 is an illustration of printing graphical content onto a white layer of a memory device of an embodiment.

When it receives the graphical image file, the printer 265 prints the graphical image onto the tray 245 of memory cards as if it were a single substrate (act 370). (As will be discussed in more detail in the following section, with some forms of graphical content, it may be preferred to first print a white layer onto the memory cards to act as a primer in order to maintain color integrity.) As discussed above, the graphical image comprises a plurality of sub-areas, with each sub-area containing graphical content and corresponding to at least one memory card in the tray 245 (i.e., the plurality of memory devices are positioned to substantially correspond with positions of the plurality of sub-areas in the graphical image). Accordingly, when the memory cards are registered in the tray 245 and the tray 235 is registered in the printer 265 (e.g., using a L-shaped stop in the printer to properly position the tray 245), the memory cards will be in the proper position to receive the graphical content in their associated sub-areas. In this way, a batch of memory cards (e.g., 120 microSD cards) can be printed in a single printing cycle (with the entire tray 245 of memory cards being considered the substrate) rather than printing each memory card individually in a serial fashion. FIG. 7 is an illustration of a tray 700 of memory devices of an embodiment after graphical content has been printed onto the memory devices.

It should be noted that the graphical content in the graphical image can be sized such that graphical content for a memory card is printed beyond the edge of the memory card. This results in "image bleeding" and can compensate for any shifting of the memory cards in the bins of the tray 245 post-registration (or if registration is not performed), as well as for design inconsistencies. For example, for some forms of graphical content, printing with a 0.2-0.3 mm margin outside of the edges of a memory card may be preferable. However, such image bleeding may stain the tray 245 with ink, which may not be acceptable in some situations, such as when the tray 245 is a JEDEC tray that is to have future uses. An alternative that address this problem is discussed later in this document.

In this embodiment, graphical content is only printed on the top surface of the memory card. In an alternate embodiment, graphical content can be printed on both the top and bottom surfaces (i.e., first and second sides) of the memory card in a single printing process cycle. For example, the graphical content on the top surface of the memory card can be a color image of album art, while the graphical content on the bottom surface of the memory card can be text indicating the manufacturer of the memory card (and other logos) and its storage capacity. To print both the top and bottom surfaces, once graphical content is printed onto one of the surfaces, the memory cards can either be turned over in the tray (e.g., by a robotic arm), or the tray can be flipped over onto another tray. In any event, it is preferred to mask the metal contacts on the bottom surface of the memory cards to prevent ink from staining the contacts.

Referring again to FIG. 3, after the graphical content is printed onto the memory cards, the memory cards are programmed with digital content (act 380). As used herein, "digital content" can take any suitable form, such as, but not limited to, video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), an application (e.g., a video game, utility programs, etc.), and a hybrid multimedia presentation of two or more of these forms. The digital content can be played from the memory card using a host, such as, but not limited to, a dedicated content player, a mobile phone, a personal computer, a game console, a personal digital assistant (PDA), a kiosk, a set-top box, and a TV system.

In this embodiment, after graphical content is printed onto the memory cards, the memory cards are placed in a printed card tray 270 (see FIG. 2), which can be the same or different JEDEC tray as the one used in the printing process, and moved to an identifier reader 275, which can be the same or different identifier reader as the one used in the printing process. The identifier reader 275 reads the bar code identifiers on the bottoms of the memory cards and sends the information to the system controller 210. The system controller 210 stores a table or database associating various bar code identifiers with digital content and sends the appropriate digital content 280, as indexed by the bar code identifier, to a card programmer 285, which programs the digital content 280 into the memory cards. The result is a magazine 290 of memory cards that are printed with graphical content and programmed with digital content, where both the graphical content and digital content for each memory card are chosen based on the identifier associated with the memory card. The identifiers can then be removed from the memory cards, if desired.

It should be noted that the printing process and the programming process can be performed during the same manufacturing run at the same facility, at different times at the same facility, or at different times at different facilities. Also, it should be noted that while digital content was programmed into the memory cards after graphical content was printed onto the memory cards in the above illustration, in an alternate embodiment, digital content is programmed before—not after—graphical content is printed onto the memory cards. It yet another alternate embodiment, digital content is not programmed into the memory cards at the manufacturing stage, and the memory cards (printed with graphical content) are sold as "blank" cards that the end user can field program as desired.

Exemplary Printer and Use of Color and Semi-Transparent Layers

While any suitable printer can be used, it is presently preferred that the printer 265 be a flat bed, ink jet printer. (Any suitable type of ink can be used.) A flat bed printer is preferred over printers that bend a substrate around cylinders during printing, as it is preferred not to bend the memory cards. An ink jet printer is preferred over pad printing. Pad printing is generally limited to full tone colors only, which means that two colors cannot be gently mixed together to form a color combination (i.e., only standard colors can be printed). This can be a problem for printing skin tones and pictures of sufficient quality. In contrast, ink jet printing provides half-tone imaging, which allows for color combinations and can print skin tones and pictures of a quality sufficient for album art and the like.

As an example of another advantage, some forms of graphical content require precise physical registration of the memory card at a certain location for accurate and uniform printing (e.g., when printing multiple layers on the memory card). The physical contact of a pad pressing against the memory card in the pad printing process can move the memory card and destroy this registration, thereby significantly degrading printing performance. Because an ink jet printer does not use a pad that comes in contact with a memory device and because ink jet printers use extremely light weight and low impact ink droplets, graphical content can be printed onto a memory card without moving the memory card and destroying its registration. This also provides advantages over other print processes, such as spraying and airbrushing, which apply streaming air that can move the memory card a trillion times more than an ink droplet from an ink jet printer.

While any suitable type of ink jet printer can be used, the UJF-605CII flatbed UV inkjet printer from Mimaki Engineering Co., Ltd. is one example of a printer 265 that may be used for this purpose. The UJF-605CII flatbed UV inkjet printer has a 600 mm×700 mm print table with vacuum plate and a printable area of 500 mm×600 mm. This allow up to five JEDEC trays (i.e., up to 600 microSD cards) to be positioned in the printing plate in one time. The UJF-605CII flatbed UV inkjet printer uses very small, six picoliter droplets of UV-curable ink, which produces smooth tonal images with no grainy pattern, a variable dot size, and high 1,200×2,400 dpi resolution. Additionally, the UJF-605CII flatbed UV inkjet printer is capable of printing eight colors, including white.

The ability to print white may be especially desirable in these embodiments. The printable surface on memory devices, such as microSD cards, is typically black plastic; however, printing certain colors directly onto a black surface may result in a faded looking image. Accordingly, in one embodiment, prior to printing the graphical content onto a memory device, a white layer 800 can be printed onto the memory device 810 as a "primer" (see FIG. 8). It should be noted that while the memory device 810 is shown as a microSD card in FIG. 8, other form factors and memory devices can be used. It should also be noted that any suitable shade of white (e.g., off white) can be used and may vary with the application. Graphical content can then be printed onto the primed memory device, resulting in a more vibrant image than if the graphical content were printed directly onto the black surface. This two-step process of printing the white layer and then printing the graphical content can take place in the same print cycle at the same printer by simply printing the white layer just before the graphical image is printed onto the memory device. Alternatively, the white layer can be printed in a different print cycle at the same or different printer. For example, a memory card manufacturer can print the white layer on a set of memory cards as part of the manufacturing process and then send the white-painted cards to a third party, who would print the graphical content on the memory cards.

Figure 10:
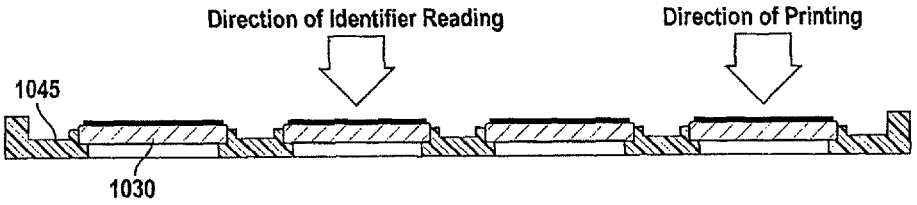
FIG. 10 is an illustration of a printing and identifier reading process of an embodiment.

The use of a white layer can provide additional advantages. For example, in one embodiment, instead of being used merely as a primer, the white layer 900 can be used to store an identifier 910 that the control system uses to index the graphical content 920 to be printed on the memory device 930. Because the identifier 910 is facing the direction of printing and will eventually be printed over, a tray 1045 with a solid bottom can be used, since there is no need to read information from the bottom of the memory cards 1030 (see FIG. 10). Preferably, the identifier has a color and shape that would not interfere with printing the graphical content over it. For example, DataGlyph technology from Xerox Corporation can be used to print a glyph image onto the white layer of a memory device, which can be read and used to identify graphical content and/or digital content associated with the memory device.

Figure 8:
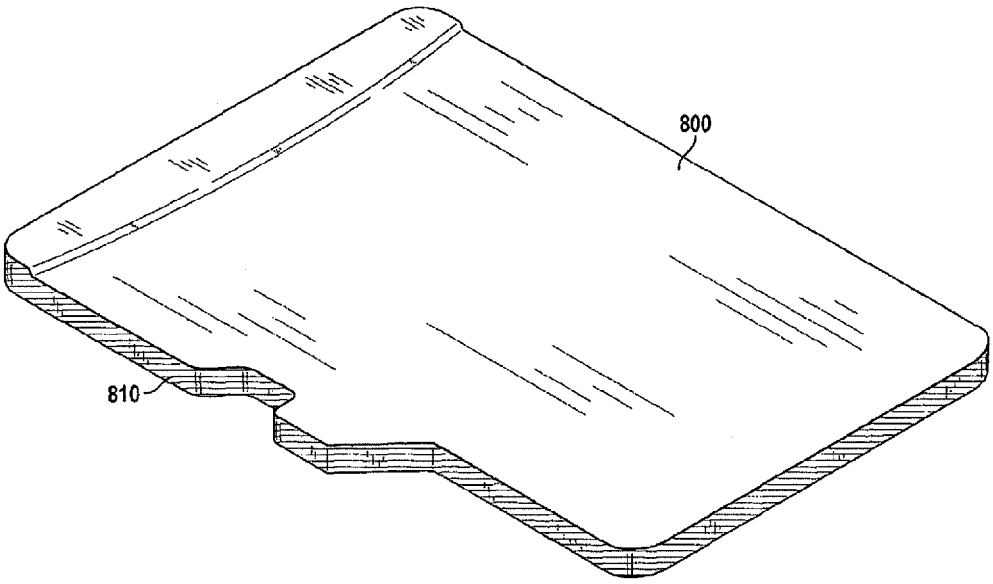
FIG. 8 is an illustration of a microSD memory card of an embodiment with a white layer on an entire top surface of the microSD memory card.
Figure 11A:
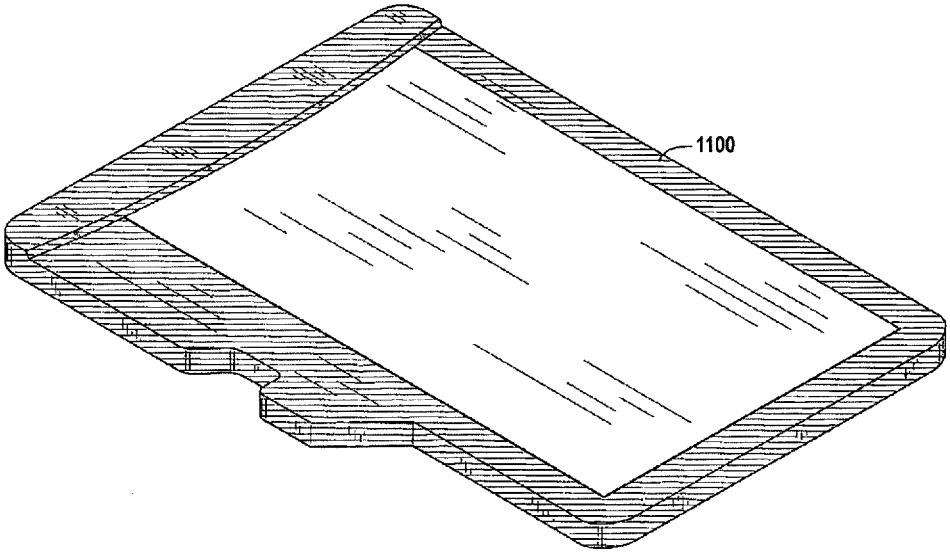
FIG. 11A is an illustration of a microSD memory card of an embodiment with a white layer on a top surface outside of a "keep out" zone of the microSD memory card.
Figure 11B:
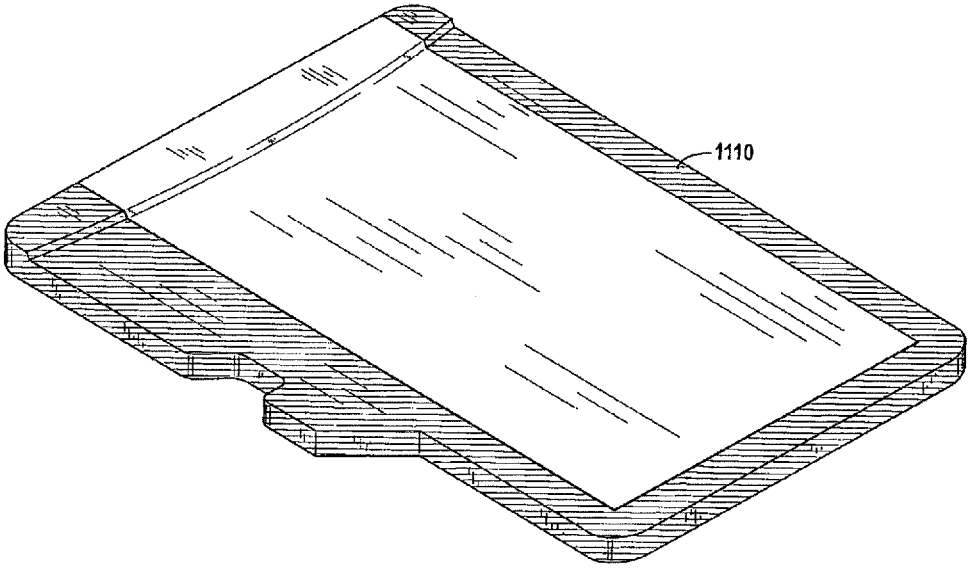
FIG. 11B is an illustration of a microSD memory card of an embodiment with a white layer on a top surface outside of a "keep out" zone of the microSD memory card and over an area of a finger grip portion.
Figure 11C:
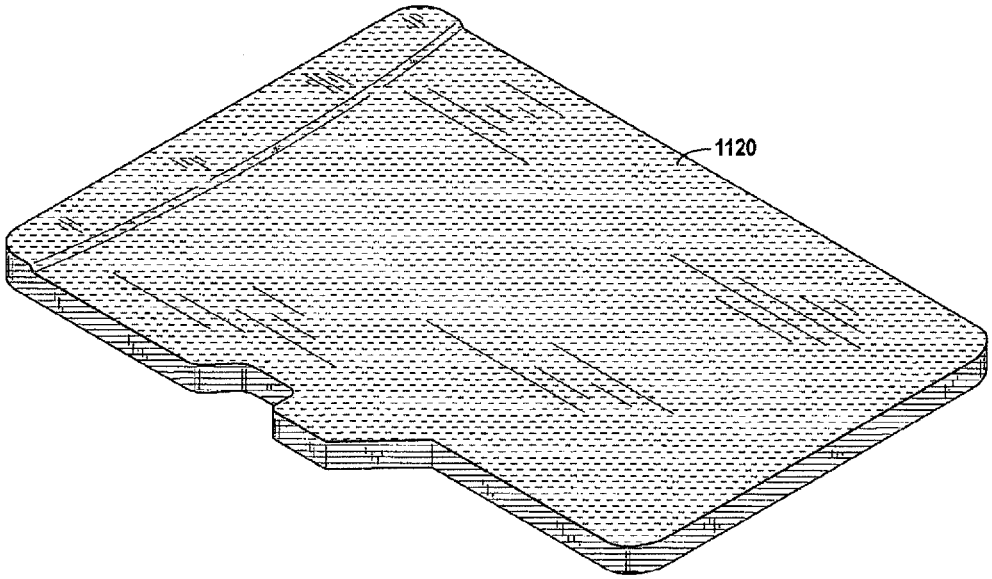
FIG. 11C is an illustration of a microSD memory card of an embodiment with a color layer on an entire top surface of the microSD memory card.
Figure 11D:
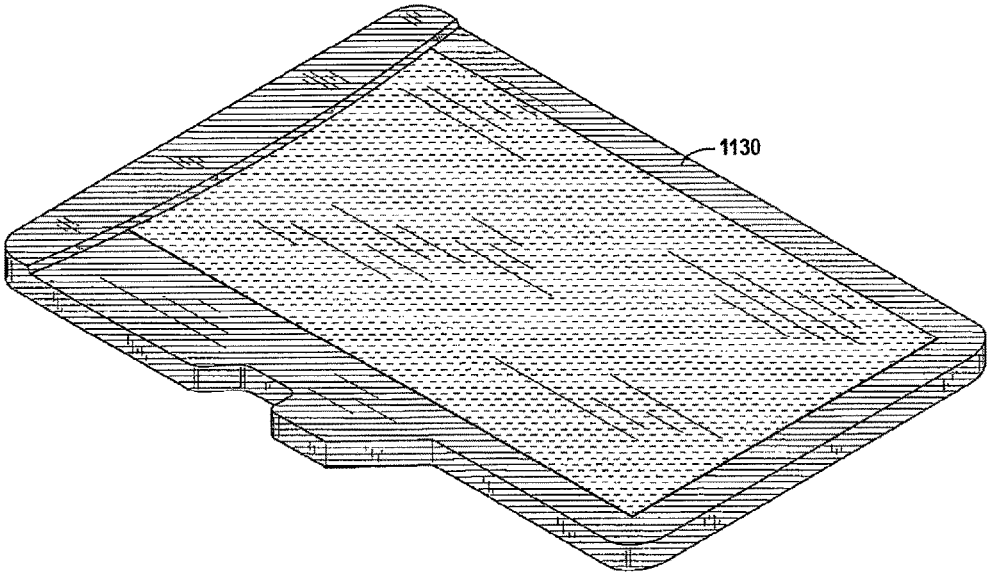
FIG. 11D is an illustration of a microSD memory card of an embodiment with a color layer on a top surface outside of a "keep out" zone of the microSD memory card.
Figure 11E:
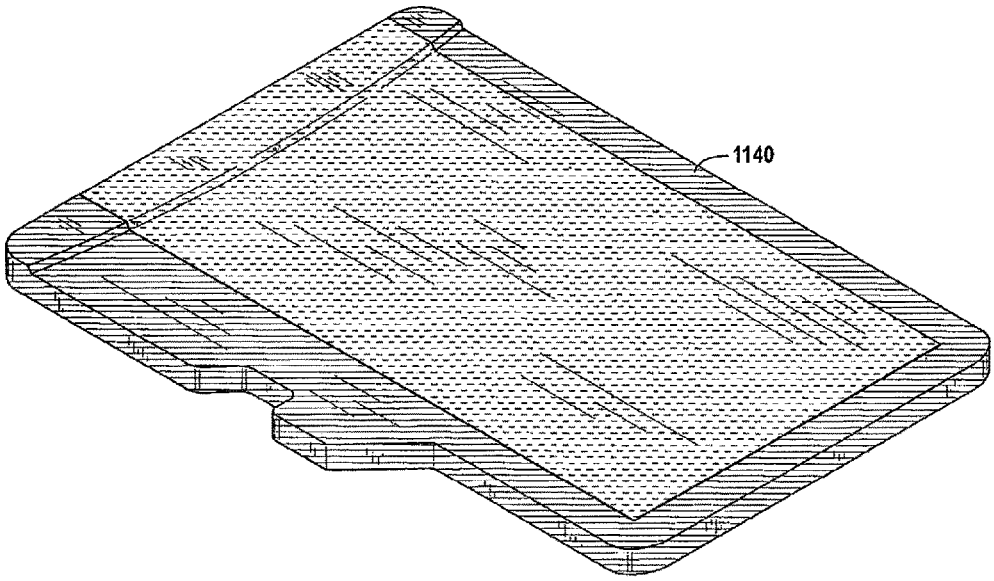
FIG. 11E is an illustration of a microSD memory card of an embodiment with a color layer on a top surface outside of a "keep out" zone of the microSD memory card and over an area of a finger grip portion.
Figure 11F:
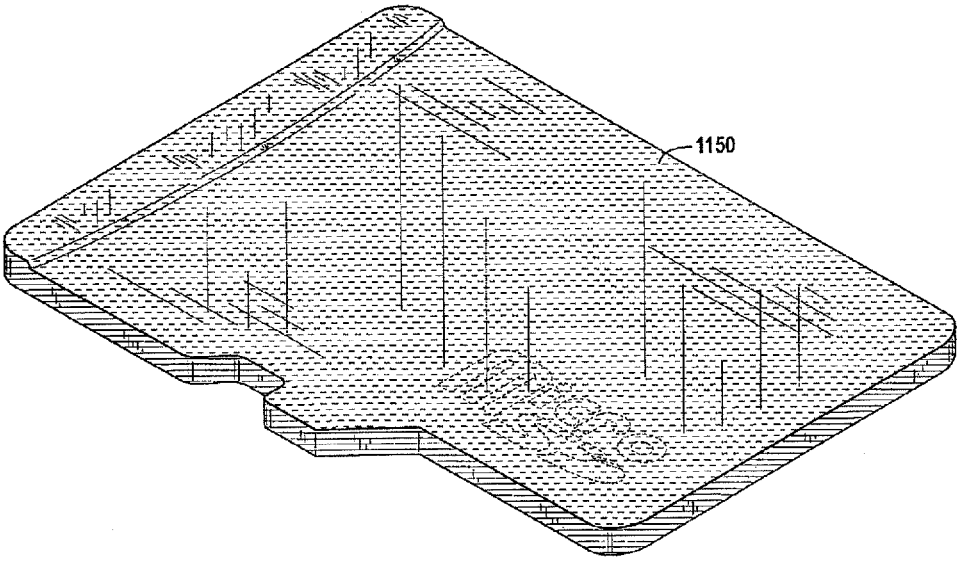
FIG. 11F is an illustration of a microSD memory card of an embodiment with a semi-transparent layer on an entire top surface of the microSD memory card.
Figure 11G:
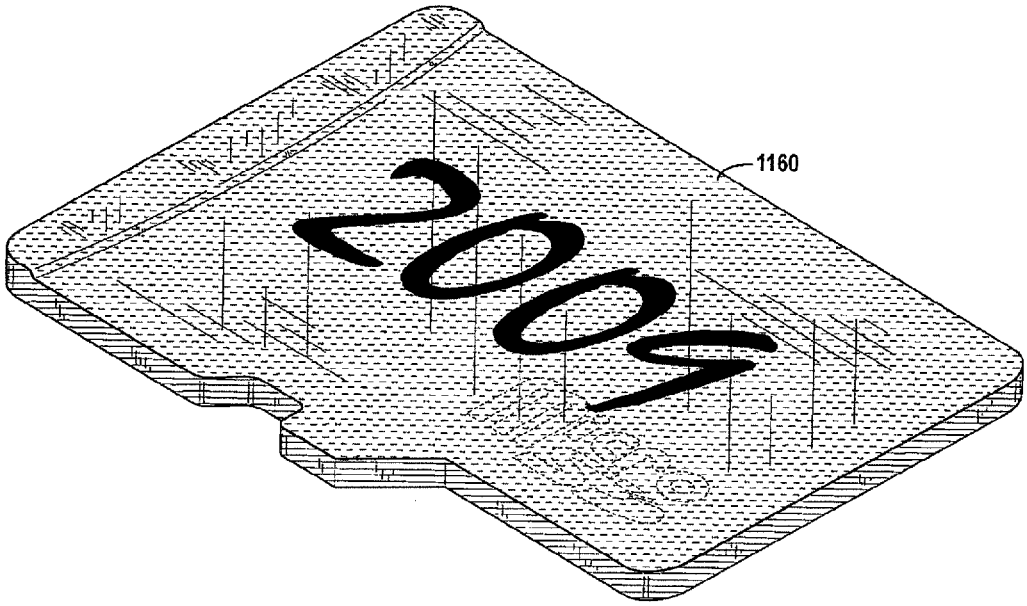
FIG. 11G is an illustration of a microSD memory card of an embodiment with a semi-transparent layer on an entire top surface of the microSD memory card, the semi-transparent layer having indicia written thereon.
Figure 11H:
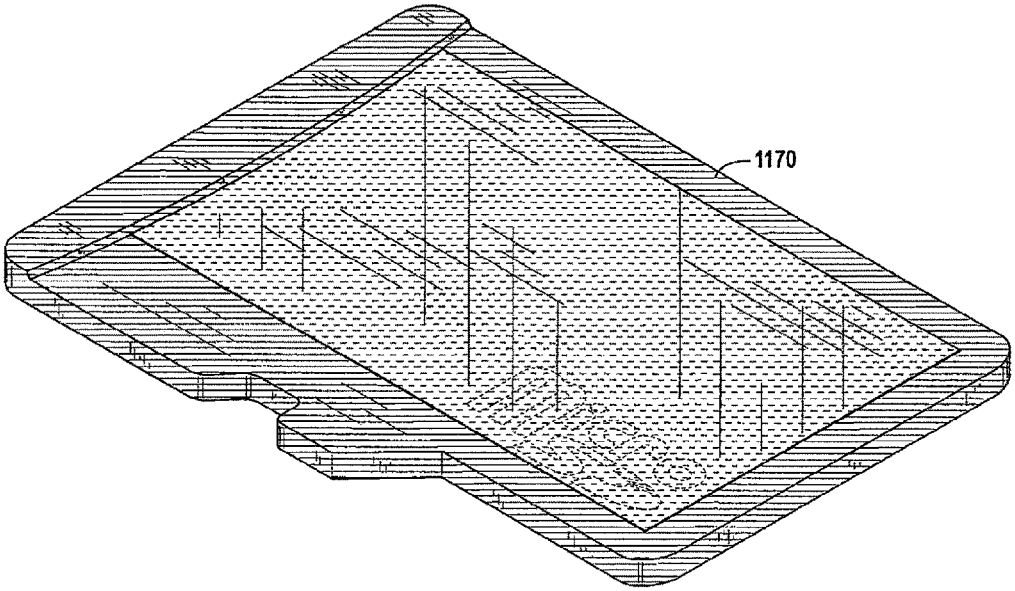
FIG. 11H is an illustration of a microSD memory card of an embodiment with a semi-transparent layer on a top surface outside of a "keep out" zone of the microSD memory card.
Figure 11I:
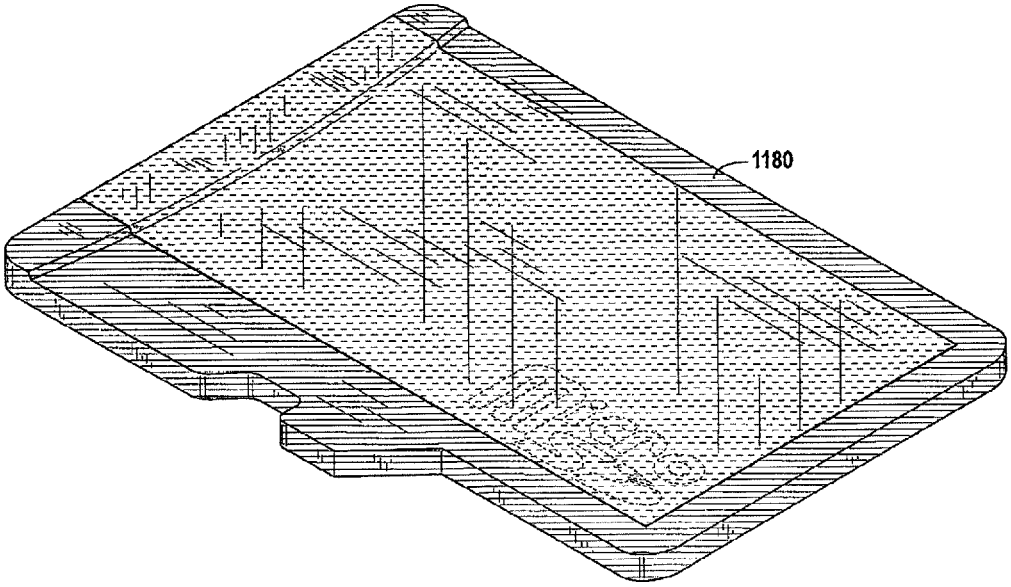
FIG. 11I is an illustration of a microSD memory card of an embodiment with a semi-transparent layer on a top surface outside of a "keep out" zone of the microSD memory card and over an area of a finger grip portion.
Figure 11J:
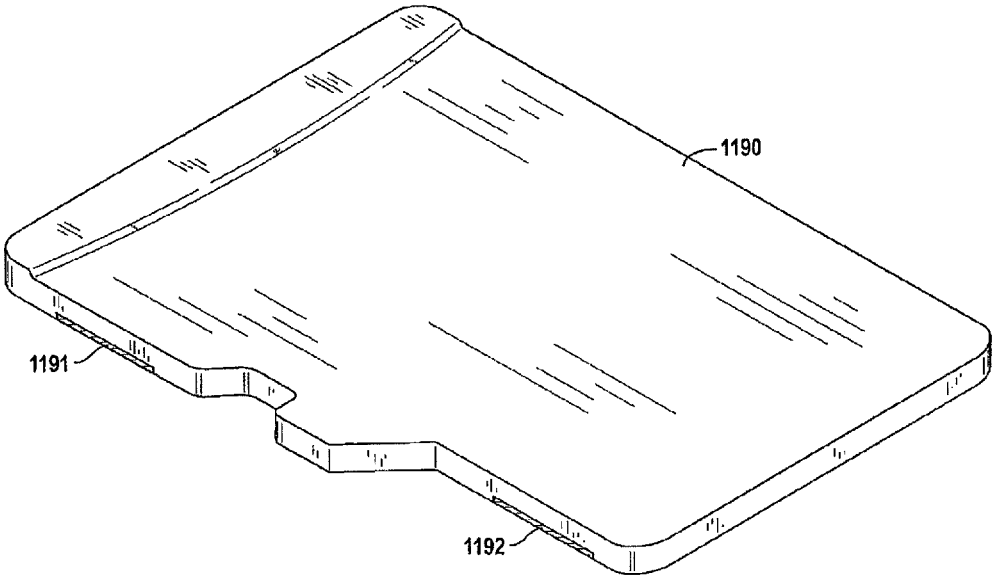
FIG. 11J is a perspective view of a microSD memory card of an embodiment having a white cap.

While the FIG. 8 shows a white layer covering the entire top surface of the memory card, other alternatives can be used. For example, in some situations, there may be restrictions (e.g., due to standards organizations) on what surfaces can and cannot be printed thereon. In such situations, the size of the graphical content can be adjusted so as to avoid printing in these "keep out" zones. Alternatively, a memory device can be covered with a physical mask to prevent ink bleeding into the "keep out" zone. For example, FIG. 11A shows a microSD memory card 1100 with a white layer printed on only some of the top surface of the memory card. In this situation, the graphical content would only be printed in the white area outside the "keep out" zone. This is in contrast to FIG. 7, where the graphical image is printed on the entire top surface of the memory card, including the grip portion. (As mentioned above, in embodiments such as this where there is a non-printed area on the top of the memory card, an identifier used to identify graphical content may be able to be placed on the non-printed area.) In FIG. 11A, the white layer ends at the finger grip portion of the card. In other embodiments, the white layer can extend over the finger grip portion, as shown in the memory card 1110 in FIG. 11B. In this embodiment, the graphical content would be printed on the white area, including over the finger grip portion. Also, while the color white was used above because of its advantage of providing a suitable primer in many situations, other colors can be used, either as a primer or simply as a way of providing a visual indication to identify and distinguish the memory card. FIGS. 11C-11E are similar to FIGS. 8 and 11A-B but show memory cards 1120, 1130, 1140 with a generic color instead of white. Additionally, instead of using an opaque color, a semi-transparent color (white or otherwise) can be used. This is shown in the memory devices 1150, 1160, 1170, 1180 of FIGS. 11F-11I. A semi-transparent color allows underlying indicia, such as the microSD logo shown in phantom in FIGS. 11F-11I, to be seen, while allowing a user to add notes on the top of the semi-transparent layer (see FIG. 11G, which shows "2009" written on top of the semi-transparent layer). This has the advantage of allowing a user to provide visual indicia of the digital content stored in the memory device while still complying with various industry standards that mandate that certain information appear on the memory device. Since it is usually easier for a user to write on a white or light color surface than on a darker black surface, using a semitransparent white or light color surface allows the user to use a regular pencil to write information on the memory cards (and later erase that written information using an eraser).

The level of transparency used can vary based on the application. In general, transparency can be though of as the relationship between a base layer and a top layer. If the transmission coefficient is zero, the base layer is not visible at all. If the transmission coefficient is one, the top layer will not be visible at all. Accordingly, if the transmission coefficient is somewhere between zero and one, the indicia on the base layer will be partially visible. Using, for example, the transparency tool of Microsoft's PowerPoint, a suitable transparency range can be between 5% and 45%, preferably between 30% and 40%. The printer can print a semi-transparent color in any suitable way (e.g., using half-toning, varying the intensity of ink, etc.). Also, as noted above, colors other than white can be used to provide a semi-transparent layer.

Some of the above embodiments assumed that the color of the memory device was a dark color, such as black, and a white or light-color primer was applied to the memory device before the graphical content was printed thereon. In an alternative embodiment, at least the top surface of the memory device is made of a white or light color material, thereby allowing the graphical content to be printed thereon without applying a primer. This alternate embodiment will now be discussed in conjunction with FIGS. 11J-11M. As shown in these figures, the microSD card has a white (or, alternatively, a light colored) cap 1190 that covers five of the six surfaces of the memory device. This cap 1190 is affixed to the bottom surface 1196 of the memory device (which contains metal contacts 1197) by any suitable mechanism. In this embodiment, the bottom surface 1196 contains several tabs 1191, 1192, 1193, 1194, 1195 that fit into corresponding recesses on the cap 1190. It should be noted that, in this embodiment, the cap 1190 is the actual top cover piece of the memory card and not an additional component that is placed on top of a standard dark-colored memory card. However, an additional component can be used in alternate embodiments.

Figure 11K:
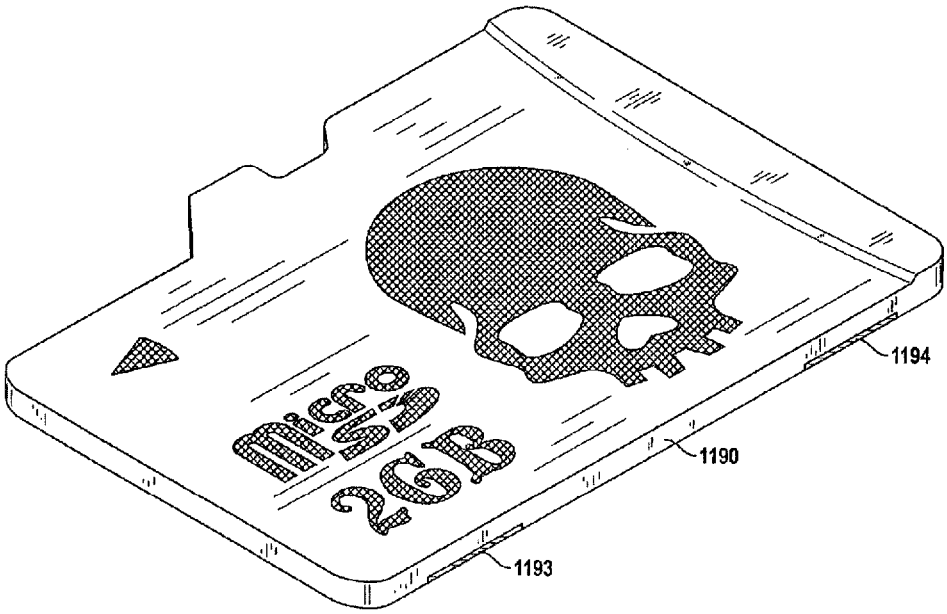
FIG. 11K is a perspective view of a microSD memory card of an embodiment having a white cap with graphical content printed thereon.
Figure 11L:
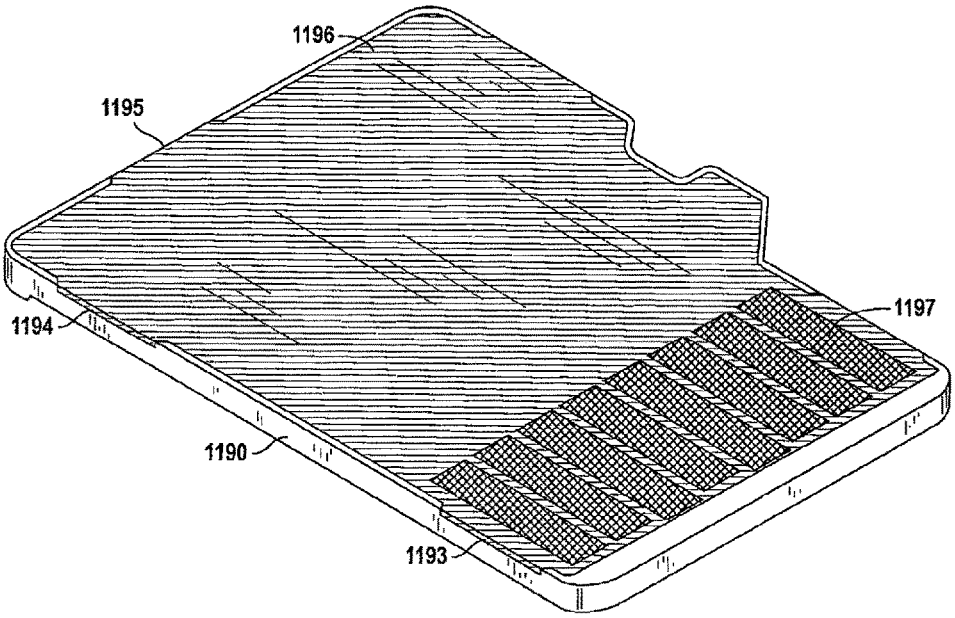
FIG. 11L is a first rear perspective view of a microSD memory card of an embodiment having a white cap.
Figure 11M:
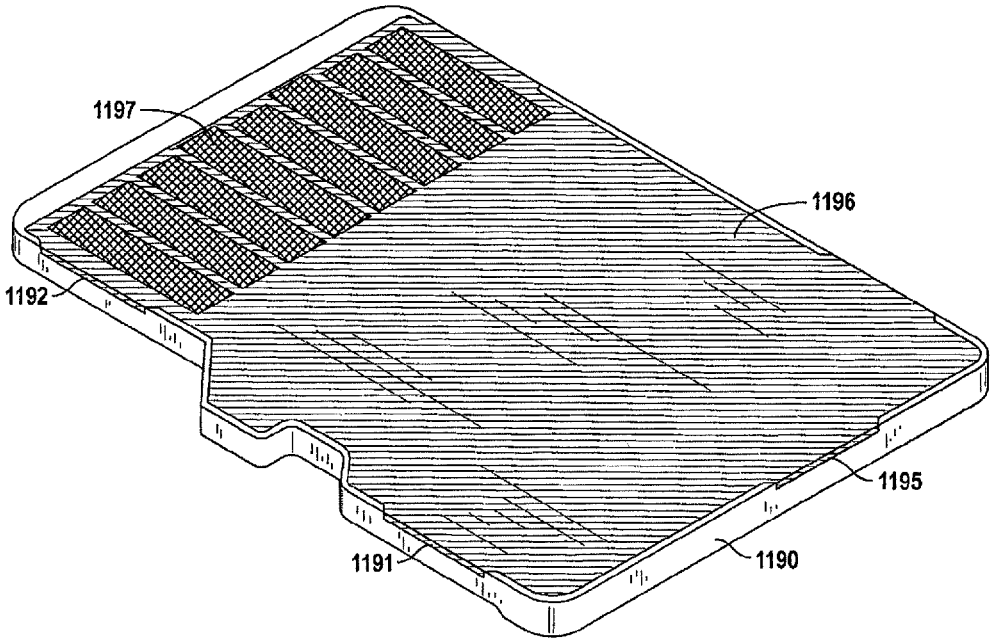
FIG. 11M is a second rear perspective view of a microSD memory card of an embodiment having a white cap.

As shown in FIG. 11K, the white or light-colored surface provides a suitable surface for printing thereon without first having to apply a primer. Additionally, while the cap 1190 shown in the drawings contains five sides of the overall memory card, in an alternate embodiment, the cap can be only the top surface (either an original or an add-on component), with the side surfaces being a different color. Also, while the cap 1190 is white or a light color in this embodiment, in other embodiments, the cap is a darker color. Accordingly, the color of the cap can be chosen based on the color of the ink to be used in the printing process and the overall image to be printed.

As an alternative to an encapsulating white cap, the thickness of the memory device can be reduced, and a thin sheet of white plastic can be glued or welded to it. For example, the white layer can be about 0.4 mm while the black body that contains the contacts and all the electronics can be about 0.3 mm. As another alternative, the entire memory card can be made from white epoxy. Typically, microSD cards are made of black epoxy. However, the epoxy does not have to be black, as the black color comes from additives used, for example, to dissipate heat. As a microSD card may be thin enough to radiate heat, it may be possible to use white epoxy without the additives that cause the card to be black. One issue that may exist with a white memory card is that the rounded corners of a microSD card are typically cut by a laser beam, which can leave burn marks that are not seen on a black card but may be visible on a white card. However, if such burn marks do exist, a thin black or brown frame can be placed around the card to conceal the burn marks, and white can be used inside the frame for printing. Besides, other cutting techniques may avoid such burn marks.

Embodiments Relating to Disposable Trays

In the above illustration, the tray took the form of a JEDEC tray. One advantage of using a JEDEC tray is that it is readily available and already sized to hold memory cards (although physical registration of the memory cards in the tray may be desired). However, because the tray serves as the substrate in the printing process, the tray may be dirtied with ink (as when the image bleeding technique discussed above is used), which may render the tray undesirable for further use. To address this problem, a second tray, preferably less expensive than a JEDEC tray and considered more disposable, can be used. This embodiment will now be discussed with reference to FIGS. 12A-12D.

Figure 12A:
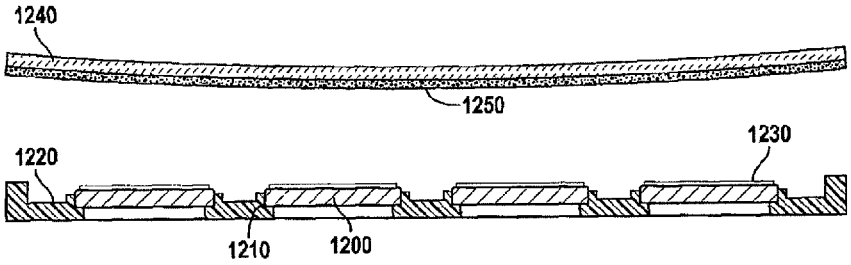
FIGS. 12A, 12B, 12C, and 12D are illustrations of a printing method of an embodiment using a secondary tray with an adhesive.
Figure 12B:
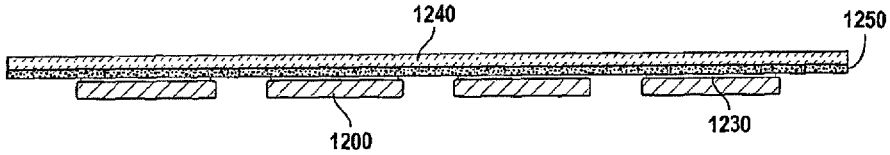

FIG. 12A shows a plurality of memory cards 1200 located in various bins 1210 of a tray 1220. Unlike the arrangement shown in FIG. 6, the memory cards 1200 in this embodiment are positioned with their identifiers 1230 facing up. Accordingly, in this embodiment, the position of the identifier reader is relocated so that it reads from the top (instead of the bottom) of the tray 1220. After the identifiers 1230 have been read but prior to printing (but preferably after physically registering the memory cards in their bins, if such act is performed), a second tray 1240 with an adhesive surface 1250 is pressed onto the bottom surfaces of the memory cards 1200 in the tray 1220. As used here, an "adhesive surface" refers to a surface that is naturally adhesive (e.g., conventional glue) or a surface that can become adhesive through an outside force (e.g., by heating the surface with an air blower or iron). For ease of use, a self-adhesive surface with a peel-off label can be used. The second tray 1240 can take any form and, in one embodiment, is a soft, thin layer of a very dense sponge material, which can accommodate the slight difference between the memory card surface and the tray ridge surface when pressed together.

Figure 12C:
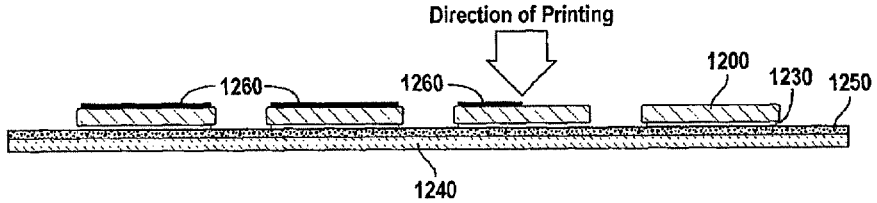

When the memory cards 1200 are pressed onto the adhesive surface 1250 of the second tray 1240, the identifiers 1230 of the memory cards 1200 (and perhaps the surfaces surrounding the identifiers 1230) stick to the adhesive surface 1250. This physically registers the memory cards 1200 to the second tray 1240, while protecting the bottoms of the memory cards 1200 from being stained with excessive bleeding ink. The first tray 1220 is then removed, either by moving the first tray 1220 away from the second tray 1240, or vice versa (see FIG. 12B), and the second tray 1240 is flipped over. A cylindrical roller can then be rolled over the memory cards to tighten them onto the second tray 1240. The second tray 1240 can then be inserted into the printer. (As mentioned above, an L-shaped frame in the printer can be used to position the second tray 1240 to the appropriate location in the printer.) As shown in FIG. 12C, printing graphical content 1260 takes place while the memory cards are adhered to the adhesive surface 1250 of the second tray 1240.

After printing is complete, the second tray 1240 can be placed over the first tray 1220, allowing the memory cards 1200 to "click" into place in the respective bins in the first tray 1220. With the memory cards 1200 secured, the adhesive surface 1250 can be peeled away from memory cards 1200. As shown diagrammatically in FIG. 12D, depending on the type of adhesive used, this peeling process can remove the identifiers 1230 on the bottoms of the memory cards 800, thereby avoiding a separate removal step. However, if the identifiers are needed to identify digital content to be programmed into the memory cards 1200, a different type of adhesive can be used that will not remove the identifiers 1230, or the programming process can take place before the printing process.

If the bins in the first tray 1220 are not sized to hold the memory cards 1200 firmly in place during the process of peeling away the adhesive surface 1250, an extraction tool can be used. For example, the second tray 1240 can be perforated with small holes at the center of each memory card, which would allow entry of pins of an inverted fakir bed, for example. (Preferably, the holes are small enough (e.g., 3 mm in diameter) and placed far enough away from the memory card conductors so that they would not allow ink to contaminate the conductors.) With the array of pins pressing the memory cards 1200 onto the first tray 1220, the adhesive surface 1250 can then be peeled off.

Figure 13A:
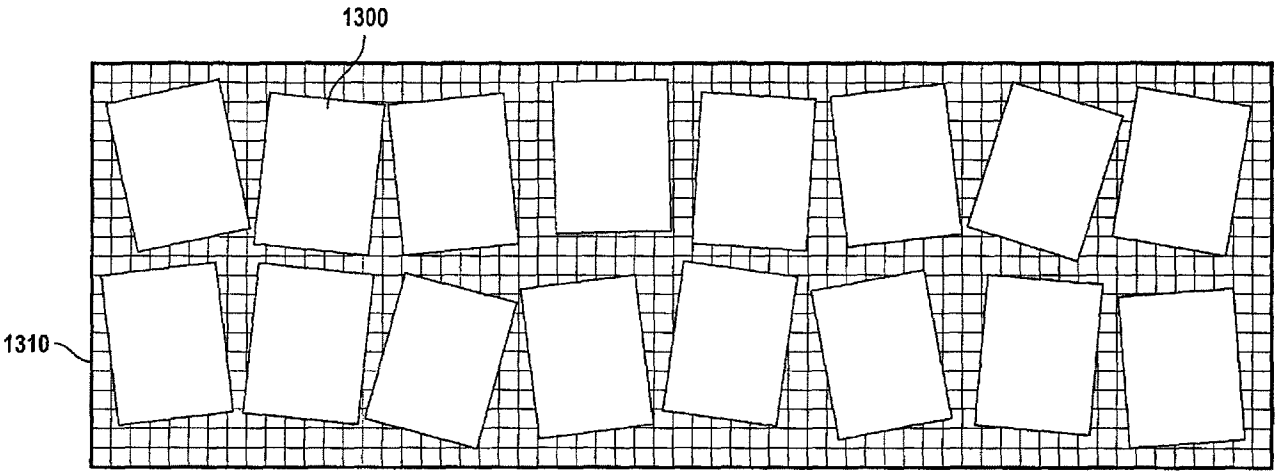
FIGS. 13A and 13B are illustrations of a scanned image of memory cards and a resulting graphical image, respectively, of an embodiment.
Figure 13B:
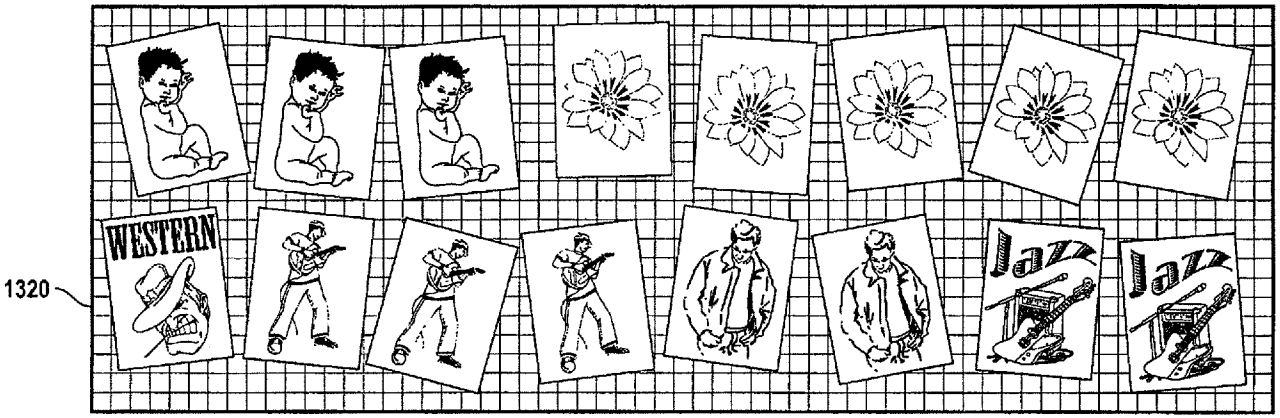

Various alternatives can be used. For example, in the above embodiment, the memory cards 1200 were physically registered in the first tray 1220 before they were transferred to the second tray 1220. As the registration process may still result in misaligned memory cards, one alternative (shown in FIGS. 13A and 13B) forgoes the registration process and instead relies upon a scanning process to identify the exact location of each memory card. In operation, after the memory cards 1300 are affixed to the second tray 1310, the second tray 1310, with attached memory cards 1300, is scanned by a flatbed scanner (e.g., an A3 scanner). In this embodiment, the second tray 1310 has printed a grid pattern printed on it. Accordingly, the image produced by the flatbed scanner will contain not only the memory cards 1300 but also the grid pattern (see FIG. 13A). An image processing program can then capture the exact location each memory card 1300 relative to its nominal position with respect to the printed grid and attach three numbers (X, Y, and rotation offsets) to each memory card. The graphical image 1320 can then be created from both the identified graphical content of the memory cards and the X, Y, and rotation offsets (see FIG. 13B).

As another alternative, the disposable tray can be designed to avoid both physical registration and scanning. In this alternate embodiment, the second tray is made of two layers of cardboard glued together. The bottom layer is rectangular and can be the size of one or more JEDEC trays (thereby allowing printing to be done in batches larger than one JEDEC tray). The top layer has a two dimensional array of rectangular holes that are, for example, 4 mm apart from each other. The holes are of the exact size of the maximum boundaries of the memory card (e.g., 11×15 mm). However, the holes do not need to follow the odd shape of the memory cards, as the rectangular holes accommodate the full length and width of the memory cards. When the memory cards are removed from the first tray and placed in the holes of the second tray, because of the size of the holes, the memory cards will not have any freedom to move. After printing, the memory cards can be taken out of the second tray and returned to the first tray, and the second tray (now covered with ink) can be disposed.

Identifier Alternatives

In the above illustration, the identifier took the form of a bar code sticker that was placed on the bottom of the memory card. Many alternatives can be used. For example, the identifier can take the form of a radio frequency identifier (RFID) tag, a color, text, etc. Also, as discussed in the previous sections, the identifier may be transitory, such as when a sticker is later peeled off a memory card or when the identifier is on the top surface of the memory card and is later printed over with graphical content. Further, instead of being visible indicia, an identifier can be data stored within the memory card itself. For example, a memory card can store data indicating the graphical content to be printed on that memory card (and possibly other memory cards), and such data can be read from the memory card during the printing process.

Instead of placing the identifiers on individual memory cards, the identifier can be placed near the bins that hold those cards in the tray. This alternative may be preferred where it is easier to place and read identifiers on the tray than on the memory cards themselves (e.g., when the memory cards are held in a tray that does not have an opening on the bottom through which to read an identifier). Each bin can contain an identifier, such that there is a one-to-one correspondence between identifiers on the tray and bins holding memory cards. Alternatively, one identifier on the tray can be associated with a plurality of memory cards. For example, if one or more rows (or columns) of memory cards in a tray are to be printed with the same graphical content, a single identifier can be placed near those rows (or columns) instead of near each bin. Taking this concept further, a single identifier can be associated with the entire tray in "mass production" situations where the same graphical content is to be printed on each memory device in the tray in a single printing process cycle (e.g., where all of the memory cards in a tray are to be printed with the same album art).

In yet another alternate embodiment, instead of using an identifier, graphical content for a memory device can be identified by a memory device's position in the overall print area. For example, if a tray is used to hold memory cards, various bin locations in the tray can be associated with respective graphical content. In this way, graphical content can vary on a row-by-row, column-by-column, or even bin-by-bin bases. So, using the example provided above, it can be predetermined that the "Elton John" label is printed on memory cards in first two rows of the tray, while the "Madonna" label is printed on memory cards in all of the remaining rows expect the last row, where the "Elton John" label is printed on memory cards in first two columns of that row and the "Madonna" label is printed on memory cards in the remaining columns of that row.

Colored Grip Embodiments

Memory devices, such as microSD cards, can be used to feed content into portable host devices, such as phones, music players, and cameras. These memory devices are often designed in accordance with strict standards of a memory organization (e.g., the SD Association (SDA)). As a result, such memory devices can be virtually identical to each other in their visual appearance. As a user may possess more than one memory card and as his cards are likely to carry different content, it is desirable for the user to be able to distinguish between memory cards. As memory cards are typically virtually identical in visual appearance, the problem is often solved by plugging the unrecognized card into a host device and checking the card's content electronically through the host device's display screen or audio output. However, when the host device is off, there is no way to recognize the card based on output from the host device. Additionally, even when the host device is on, it may be desirable to be able to recognize a card plugged in the host device without going through the effort of turning the device on, initializing it, and electronically checking the content of the card.

The embodiments discussed above can be used to help a user visually distinguish a memory card. For example, graphical content (e.g., album or movie art) printed on the face of a memory card can identify the digital content stored on the card, as can a memory card with a different color surface or a memory card with a user-writable semi-transparent surface. However, with those embodiments, the identifying indicia may only be seen when the card is extracted from a host device and may not be seen when the card is within the host device, and it may be desirable for a user to be able to recognize a card plugged in the host device without taking the card out of the host device.

To address these issues, in this embodiment, a memory device is presented with a colored grip that can be seen when the memory device is inserted into an open memory device socket of a host device. This allows a card consumer to easily visually recognize a specific memory card of his inventory without having to operate the host device to electronically determine the content of the memory device. Additionally, the color grip provides visual distinction when the memory device is removed from the host device and is placed among other memory devices.

Figure 12D:
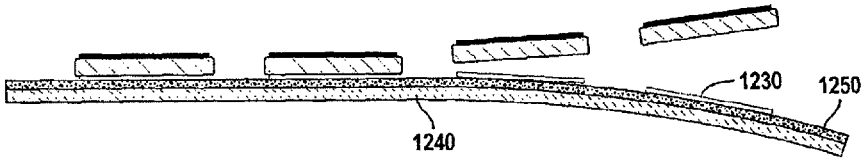
Figure 14A:
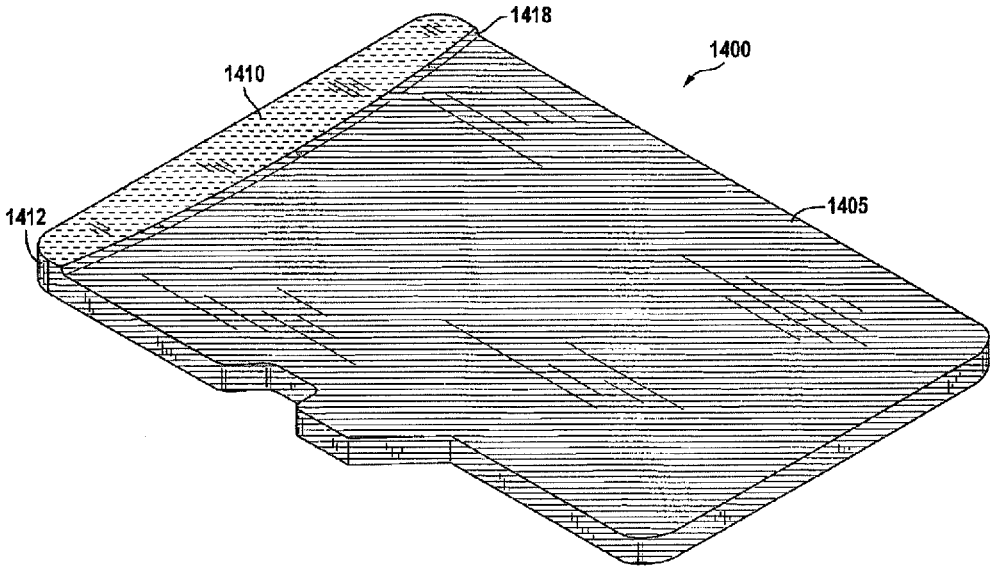
FIGS. 14A-14F are illustrations of a memory device of an embodiment with a colored grip.
Figure 14B:
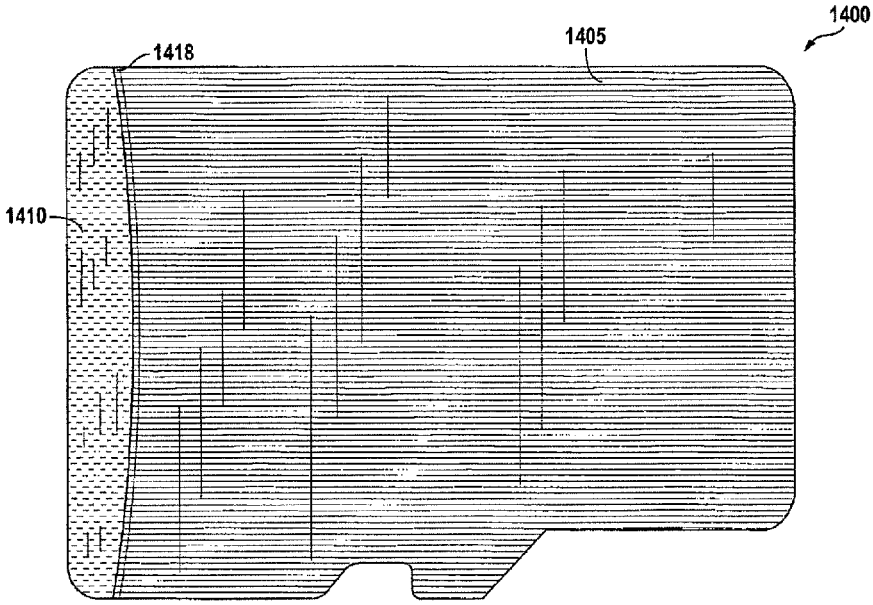
Figure 14C:
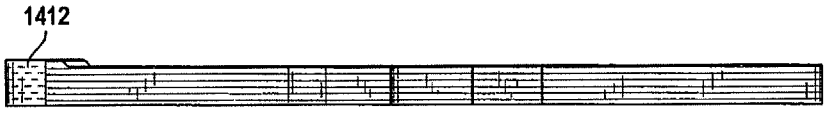
Figure 14D:
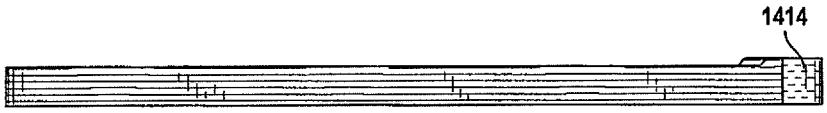
Figure 14E:
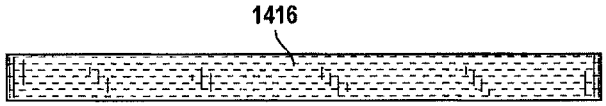
Figure 14F:
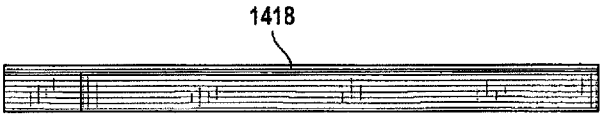

Turning now to the drawings, FIGS. 14A-14F are illustrations of a memory device 1400 of an embodiment with a colored grip 1410. (Here, the memory device 1400 takes the form of a microSD memory card. It should be understood that this embodiment can be applied to other types of memory devices having different form factors.) The grip 1410 of the memory device 1400 is provided to allow a user to more easily grasp the memory device 1400, such as with the user's fingernail. As shown in these drawings, in this embodiment, the entire top surface of the grip 1410 (FIGS. 14A and 14B) and the entire rear surface 1416 of the grip 1410 (FIG. 14E) are colored differently from the rest of the memory device 1400. Because of the curvature of the rear surface 1416 of the memory device 1400, the left and right side curves 1412, 1414 of the grip 1410 are also colored (FIGS. 14C and 12D). Also, in this embodiment, the slanted portion 1418 leading from the top surface 1405 of the memory device 1400 to the grip 1410 is not colored along with the grip 1410. However, in other embodiments shown and described herein, that portion 1418 is also colored.

Figure 15:
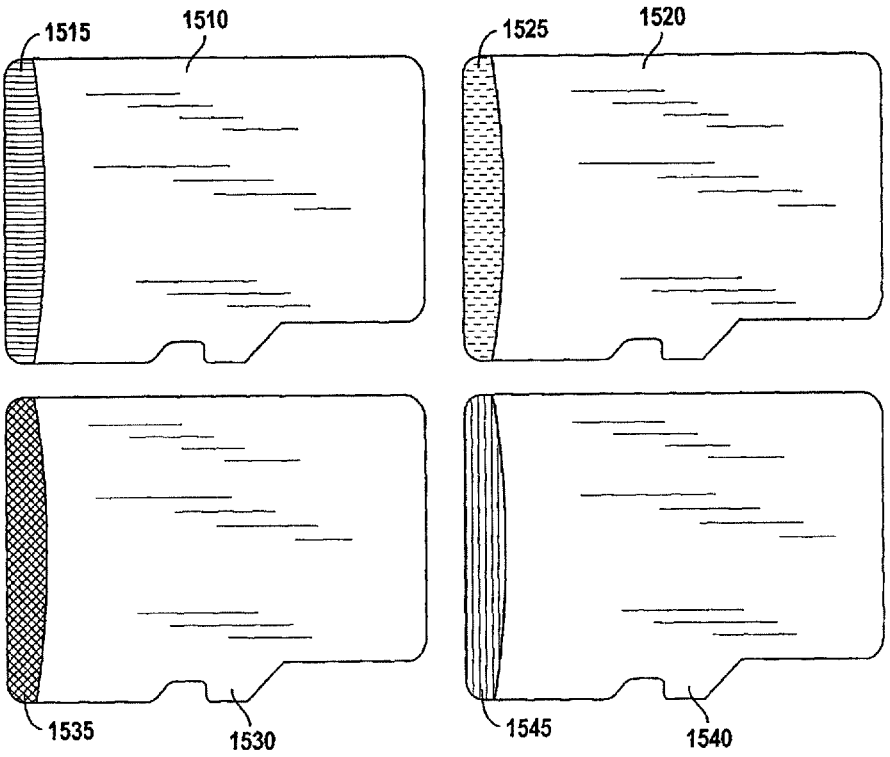
FIG. 15 is an illustration of a four memory devices of an embodiment with different colored grips.
Figure 16:
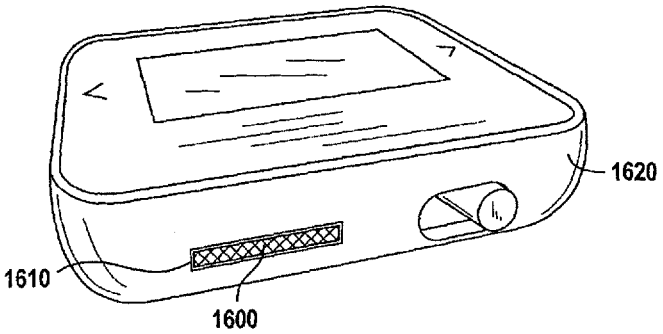
FIG. 16 is an illustration of a host device and a memory device with a colored grip of an embodiment.

A memory device with a colored grip provides several advantages. First, as shown in FIG. 15, when several memory devices 1510, 1520, 1530, 1540 are assembled together, the colored grips 1515, 1525, 1535, 1545 provide an easy mechanism to visually distinguish one memory device from the other (especially where, as shown here, the top surface of the grip is colored). This avoids the user having to insert a given memory device into a host device to electronically read the content of the card. Also, when the rear surface 1600 of the grip is also colored, the colored rear surface 1600 is visible when a memory device is plugged into an open socket 1610 of a host device 1620 (see FIG. 16). So, even when the memory device is inserted into a host device 1620, the colored rear surface 1600 of the memory device allows a user to visually identify the memory device.

Figure 17A:
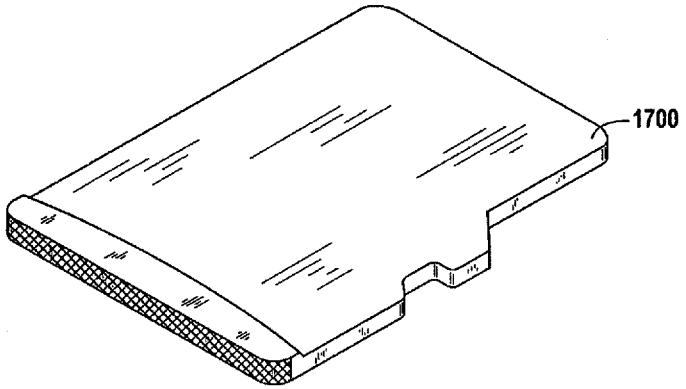
FIGS. 17A-17H are illustrations of various embodiments of memory devices with colored grips.
Figure 17B:
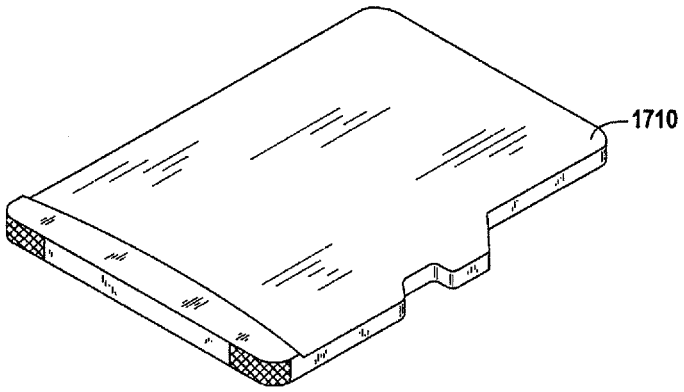
Figure 17C:
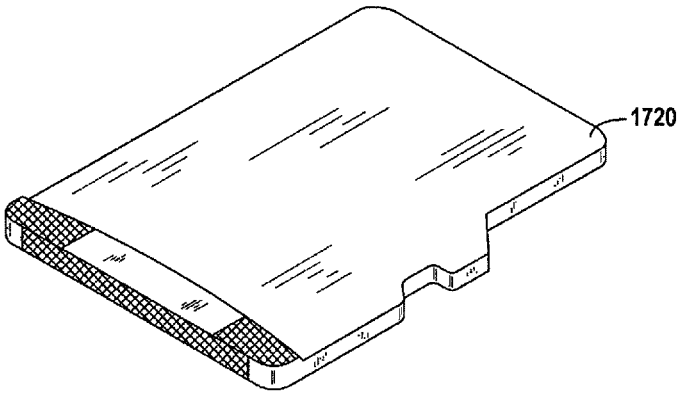
Figure 17D:
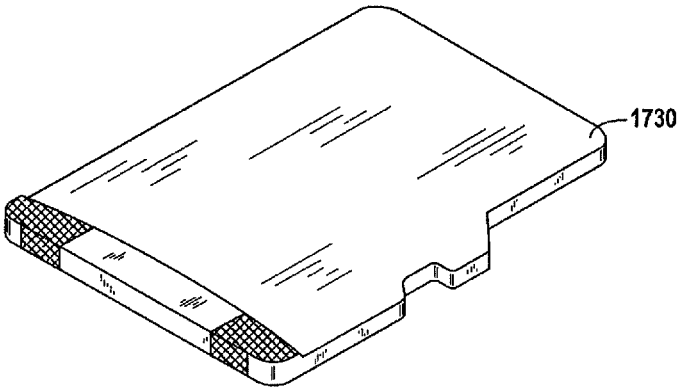
Figure 17E:
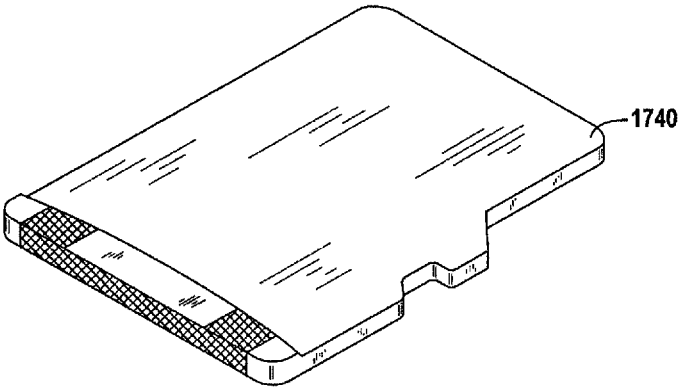
Figure 17F:
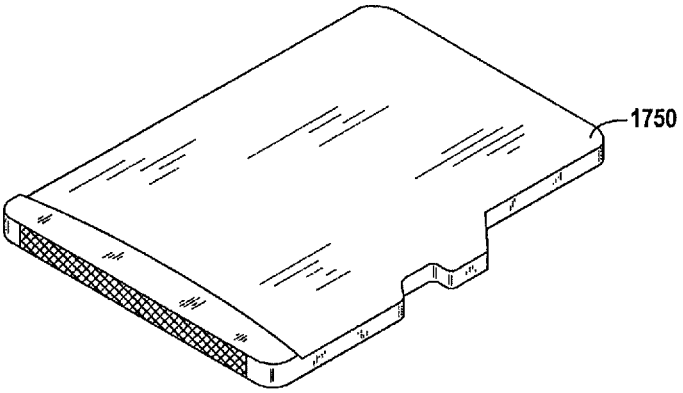
Figure 17G:
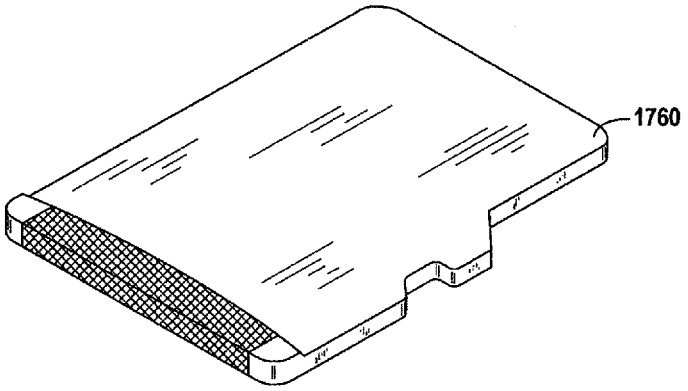
Figure 17H:
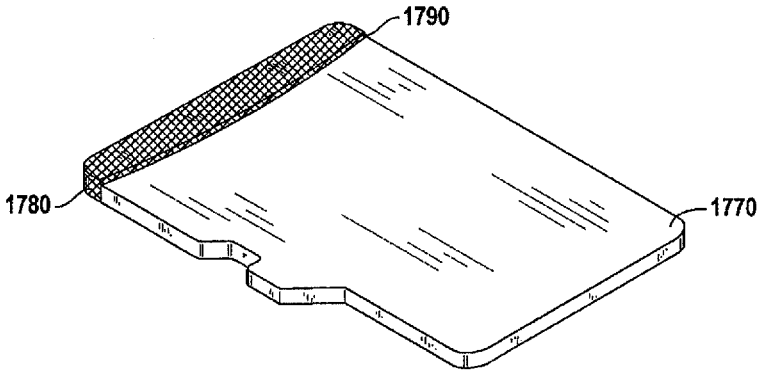

It should be understood that the particular areas of the grip that are colored in the foregoing figures are merely examples and different areas of the grip can be colored. This variation provides another visual distinction that can aid in distinguishing a memory device. Examples of such different areas are shown in FIG. 17A-17H. In FIG. 17A, the rear and side curves of the memory device 1700 are colored but not the top surface of the grip. Although the top surface of the grip is not colored, the memory device 1700 can still be identified when placed in a host device because of the colored rear surface. The same is true with the memory device 1710 in FIG. 17B, where only the corners of the rear surface are colored. In the memory devices 1720, 1730, 1740 of FIGS. 17C, 17D, and 17E, parts of both the rear surface and the top surface of the grip are colored, making the memory devices 1720, 1730, 1740 easier to recognize from other points of view. As another alternative, while the corners of the rear surface were colored in some of the above examples, the corners of the rear surfaces of the memory device 1750, 1760 of FIGS. 17F and 17G are not colored. As will be discussed below, this layout may be preferred when a colored label is placed on the grip. As yet another alternative, the memory device 1770 of FIG. 17H has color on the entire side surface 1780 under the grip portion (as compared to some of the prior embodiments where the color was only on the curved side portion) and color on the slope 1790 leading from the top surface of the memory card to the top surface of the grip. This alternative will be discussed in more detail below in conjunction with some exemplary printing techniques.

It should be understood that many other alternatives can be used with these embodiments. For example, while the above-described figures show a single color on the grip portion, multiple colors can be used (e.g., different colors on the left and right sides of the grip, a spectrum of colors progressing from one side of the grip to the other, etc.) Accordingly, a particular type of color and/or layout should not be read into the claims unless explicitly recited therein.

Figure 18A:
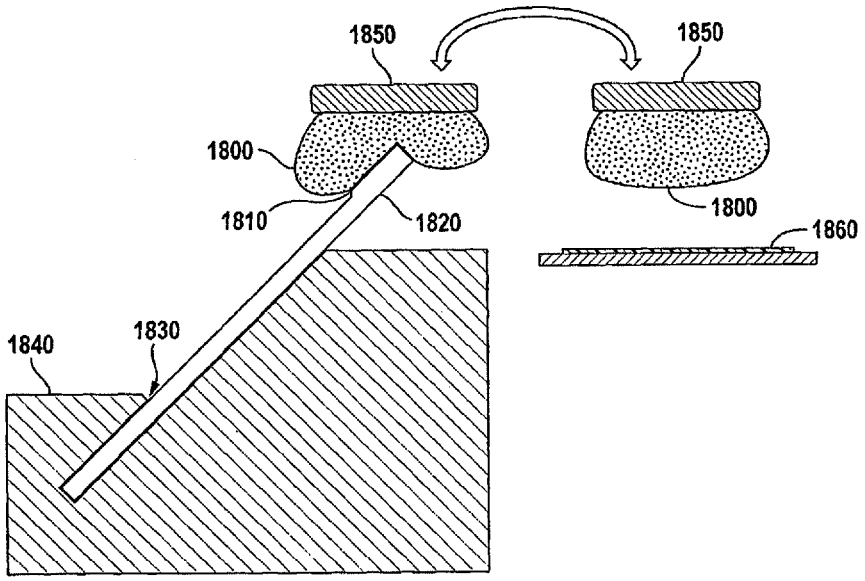
FIGS. 18A and 18B are illustrations of embodiments of printing techniques that can be used to create a colored grip on a memory device.
Figure 18B:
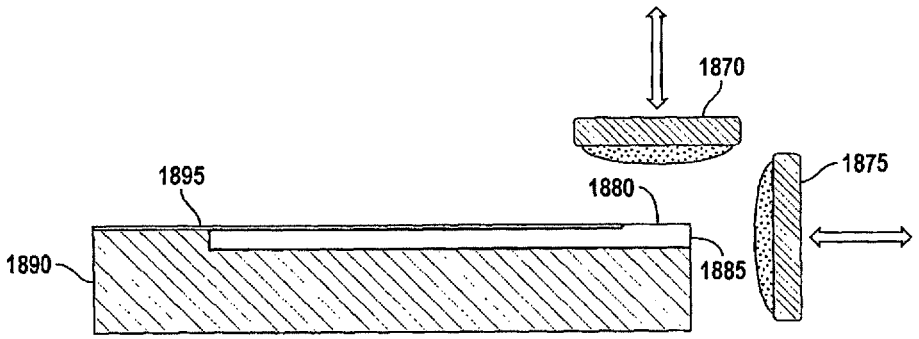

Also, the color can be placed onto the grip in any suitable manner. In one embodiment, the color is placed using a printing technique, such as, but not limited to, pad (tampon) printing, inkjet printing, and silkscreen printing. Where color is to be printing on other surfaces of the memory device for other reasons (e.g. for printing graphical content onto the face of the device), it may be preferred to have a single print operation cover all the printable areas on the device in one step to save time and ink. While any suitable printing technique can be used, FIGS. 18A and 18B illustrate two exemplary techniques. These are merely examples, and other techniques can be used. Turning first to FIG. 18A, an inked pad 1800 is used to paint ink onto the grip 1810 of a memory card 1820. In this embodiment, the memory card 1820 is placed into a slot 1830 of a card support 1840. A pad holder 1850 is moved to press the pad 1800 into an ink pan 1860 and then moved to press the inked pad 1800 onto the card grip 1810. Because of the pliability of the pad 1800, when the pad 1800 is pressed onto the card grip 1810, it deforms around the card grip 1810, thereby painting both the top and rear surfaces of the card grip 1810. In the printing technique shown in FIG. 18B, two pads 1870, 1875 are used to print ink on top and rear surface 1880, 1885 of the grip. In this embodiment, a card support 1890 is used to counter the horizontal and vertical forces applied by the two pads 1870, 1875, and a mask 1895 is used to prevent ink from the vertical pad 1870 from staining the top surface of the memory card, as well as the sloped area lead from the top surface of the memory card to the top surface 1880 of the grip.

Figure 19A:
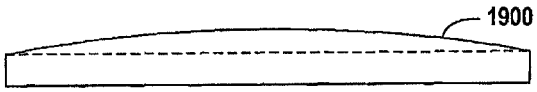
FIGS. 19A-19C are illustrations of labels of embodiments that can be used to create a colored grip on a memory device.
Figure 19B:
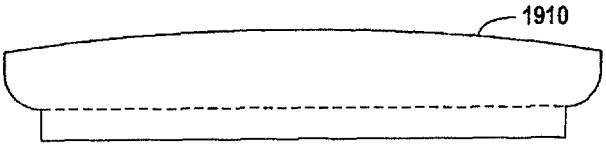
Figure 19C:
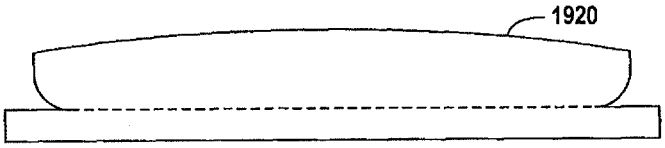
Figure 20:
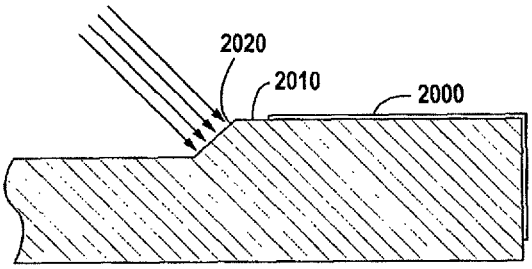
FIG. 20 is an illustration of a label placement technique of an embodiment.

As an alternative to printing, a label can be used to provide color onto the grip. The form and shape of the label can vary based on the desired location of the color. FIGS. 19A, 19B, and 19C provide examples of such labels 1900, 1910, 1920. Also, because a user often will use his fingernail to grip the grip portion of the memory device, it may be desired to provide a "safety margin" 2010 between the label 2000 and the edge 2020 of the grip portion to avoid a user accidentally peeling off the label with his fingernail (see FIG. 20, where the fingernail contact is depicted using diagonal arrows). This "safety margin" can come in many different forms (see, for example, FIGS. 17B, 17C, 17D, 17E, and 17F). In one embodiment, wherein the memory device is a microSD card, the "safety margin" can be 0.2 mm, although other sizes can be used. Also, it may be preferred to have a label shape that does not cover the corners of the memory device (see FIG. 17G) to avoid the label peeling off the corners.

There are several advantages of using a label as compared to printing ink on the grip portion. For example, the colors on a label can be brighter and more complex than colors printed using ink, thereby enhancing the visual distinction. Also, the process is generally simpler and clearer than printing, and memory device manufactures may already have experience in applying labels to memory devices in other contexts. Further, although there are precise height requirements of the body of a microSD card to ensure that the card will fit into a socket of a host device, the additional thickness that the label adds to the grip portion of the card should not interfere with the instruction of the card into a host device. However, if thickness is a concern, printing may be preferred.

Embodiments Related to Printing on a Sloped Surface

In both the graphical content and colored grip embodiments discussed above, it is sometimes desired to print not only on the flat portion of the memory device (e.g., the flat top surface of the grip portion and the main top surface of a microSD card) but also on the sloped portion connecting the top surface of the grip portion and the main top surface of the microSD card (or even a substantially vertical surface). However, when printing graphics using a flatbed inkjet printer on a surface of a non-planar object, such as a microSD card, it can be difficult to obtain uniform ink coverage of both flat portions and the inclined portion, as the ink is distributed under the assumption that the entire surface is flat, and inclined portions get much less ink density. Accordingly, the resulting image tends to have poor coverage in the inclined portions. When printing a batch of many microSD cards, each having a grip area that is deliberately elevated above the main body of the card, the steep stair (i.e., the inclined/sloped portion) that connects the two flat surfaces (i.e., the grip area and the main body) will get less ink than the two flat surfaces. As the inclined portion of a micro SD card is curved, this poor ink coverage may be visible as a curved stripe of insufficient ink across the image and may be especially conspicuous when the card is black. One way to address this issue is to avoid printing on the grip area and the sloped portion, as shown, for example, in FIG. 11D. However, this results in a smaller image than if the entire top surface of the card were printed upon. Another way to address this issue is to cover the sloped portion with an extra amount of ink. However, this may require very precise registration that may not be feasible when a memory card is loosely placed in a bin of a tray.

Another way to address this issue is by controlling the direction of printing and the speed of the inkjet print head. Specifically, the inkjet printer can be programmed to move the print head at a relatively high speed and dispense ink only when moving in a single designated direction, namely, the direction of escalation of the sloped surface. This approach takes advantage of the fact that a jig or other mechanism can be used to place memory cards on a printer bed with all the stair portions being parallel and oriented in the same direction (e.g., so that the stair portions are perpendicular to the direction in which the print head travels). The print head, which typically moves in two directions, can be programmed to print only when moving in the direction of escalation of the stair portions and not in the reverse direction. The speed of the print head can be controlled such that the speed of motion of the print head can be of the same order of magnitude as the speed of the ink droplets, which is typically four meters per second. The motion of the droplets (downward toward the print medium) and the motion of the print head (forward across the print medium) create a diagonal vector of velocity of the droplet towards the surface of the print medium, enabling the inkjet droplets to hit both the flat surface of the main body of the microSD card and the inclined surface of the steep stair portion. Ideally, if the angle of the diagonal bisects the angle between the flat surface and the stair, both surfaces will see the same coverage of ink. By controlling the print head in this manner, reasonably uniform coverage of ink can be achieved by an off-the-shelf printer on all of the surfaces of multiple topographically uneven cards. This approach will be discussed in more detail in conjunction with FIGS. 21A-21H.

Figure 21A:
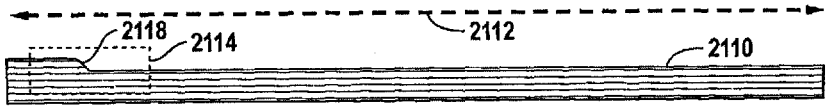
FIGS. 21A-21H illustrate printing techniques of an embodiment.
Figure 21B:
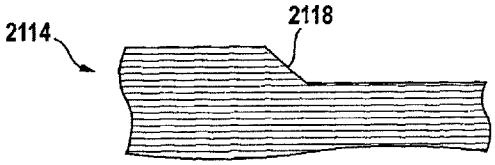
Figure 21C:
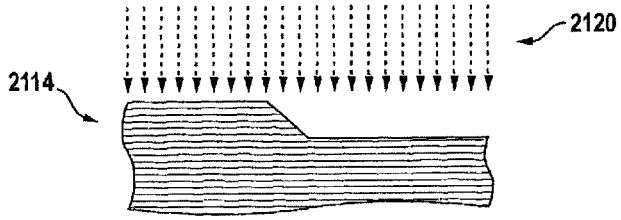
Figure 21D:
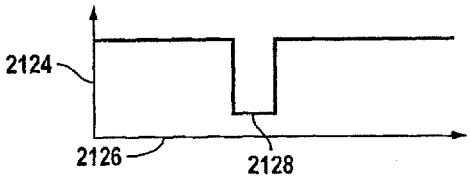
Figure 21E:
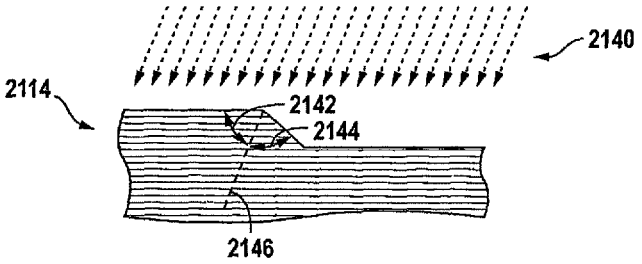

FIG. 21A is a side view of a memory card 2110, and line 2112 indicates the direction of motion of an inkjet print head in the printing embodiments discussed above. The area of the sloped surface 2118 is contained in frame 2114 and is shown in an enlarged form in FIG. 21B. FIG. 21C shows that, typically, ink droplets 2120 fall generally vertically onto the top surfaces of the grip and main top surface of the memory card. The density of coverage is shown in the chart in FIG. 21D, where the horizontal axis 2126 is the location across the memory card (i.e. across the length in FIG. 21C), and the vertical axis 2124 is the relative density of the ink on the surface. As can be seen in FIG. 21D, the sloped surface 2118 has smaller density 2128 than the flat surfaces on either side of it, as the sloped surface 2118 is effectively treated as a flat portion so that the same amount of ink falls on the larger area of the sloped surface 2118 as would fall on a smaller area of the flat portion. FIG. 21E shows a preferred scenario, where the direction of the droplets 2140 is parallel to the bisector 2146 of the angle between the grip portion and the top portion of the memory card (i.e., between the stair and the plane)—namely, angle 2142 is equal to angle 2144. In this scenario, the density of ink on the sloped surface is equal to the density of ink on the flat surfaces. This is shown in the chart in FIG. 21F, which depicts an even density of ink 2148 across the length of the memory card and does not have a dent at the location of the sloped surface.

Figure 21F:
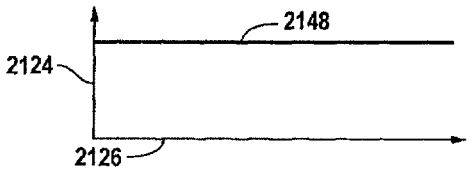
Figure 21G:
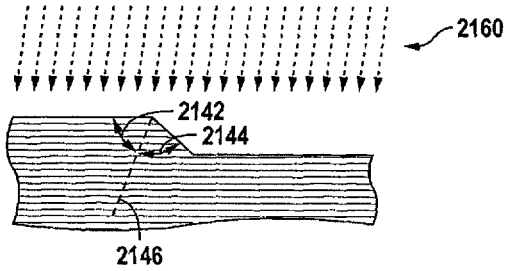
Figure 21H:
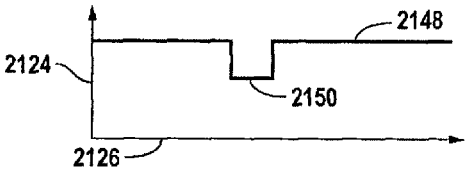

FIGS. 21E and 21F may be considered ideal situations as, in the real world, the speed of the print head can be smaller than the speed of the ink droplets. Accordingly, as shown in FIG. 21G, the direction of the ink droplets 2160 may be more vertical than the angle bisector 2146 of FIG. 21E. In this case, the coverage of the sloped surface will not be as even as the situation shown in FIG. 21E, but it will nevertheless by less uneven than the situation shown in FIG. 21C. This is shown in the chart of FIG. 21H, wherein the dent 2150 is considerably shallower than the corresponding dent 2128 in FIG. 21D.

Also, it should be noted that graphical content printed with this "steep-surface" printing technique may need to be preconditioned so that it appears accurate to a viewer. Such preconditioning can be easily checked and calibrated using a test pattern that is printed with this preconditioning and then viewed by a user. This preconditioning may include, for example, shifting the image so that the diagonal stream of droplets will meet the substrate in the right location (in ordinary printing, there is no need to shift as the vertical droplet meets the surface exactly under the nozzle).

CONCLUSION

It should be understood that various embodiments have been provided, and each of the embodiments can be used alone or together in combination. Also, the following patent applications show and describe embodiments that can be used with the embodiments disclosed herein. Each of these patent applications is hereby incorporated by reference: "MicroSD Memory Card with Different Color Surfaces;" U.S. patent application Ser. No. 29/345,635, "MicroSD Memory Card with Semi-Transparent Color Surface," U.S. patent application Ser. No. 29/345,641, and "MicroSD Memory Card with Colored Grip," U.S. patent application Ser. No. 29/345,643.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for printing graphical content onto a plurality of memory devices, the method comprising:

identifying graphical content to be printed onto a plurality of memory devices;

creating a graphical image from the identified graphical content, wherein the graphical image comprises a plurality of sub-areas, wherein each sub-area contains graphical content and corresponds to at least one memory device of the plurality of memory devices; and printing the graphical image onto the plurality of memory devices, wherein the plurality of memory devices are positioned to substantially correspond with positions of the plurality of sub-areas in the graphical image;

wherein each memory device comprises an identifier, and wherein the graphical content to be printed onto a given memory device is indexed by the identifier.

2. The method of claim 1, wherein each sub-area is exclusively associated with a particular one of the plurality of memory devices such that there are at least as many sub-areas as there are memory devices.

3. The method of claim 1, wherein each sub-area is exclusive and contains non-overlapping graphical content relative to another sub-area.

4. The method of claim 1, wherein each memory device in the plurality of memory devices is identified with the same graphical content.

5. The method of claim 1, wherein an identifier of at least one memory device comprises one or more of the following: a bar code, a radio frequency identifier (RFID) tag, a color, a removable sticker, printed information, and stored data.

6. The method of claim 1, wherein at least one identifier identifies an internal characteristic of a respective memory device.

7. The method of claim 6, wherein the internal characteristic comprises one or more of the following: stored digital content, digital content to be stored, storage capacity, processing capability, and hardware configuration.

8. The method of claim 1, wherein the plurality of memory devices are arranged in a tray.

9. The method of claim 8, wherein the tray comprises a reusable tray.

10. The method of claim 8, wherein the tray comprises a Joint Electronic Devices Engineering Council (JEDEC) tray.

11. The method of claim 8, wherein the plurality of memory devices are arranged in two dimensions in the tray.

12. The method of claim 1, wherein the graphical image is printed using an ink jet printer.

13. A memory device with a printed surface, wherein the surface is printed using the method of claim 1.

14. A method for printing graphical content onto a plurality of memory devices, the method comprising:

identifying graphical content to be printed onto a plurality of memory devices;

creating a graphical image from the identified graphical content, wherein the graphical image comprises a plurality of sub-areas, wherein each sub-area contains graphical content and corresponds to at least one memory device of the plurality of memory devices; and printing the graphical image onto the plurality of memory devices, wherein the plurality of memory devices are positioned to substantially correspond with positions of the plurality of sub-areas in the graphical image;

wherein the plurality of memory devices are arranged in a tray, and wherein graphical content to be printed onto a given memory device is designated according to that given memory device's position in the tray.

15. A memory device with a printed surface, wherein the surface is printed using the method of claim 14.

16. A method for printing graphical content onto a plurality of memory devices, the method comprising:

identifying graphical content to be printed onto a plurality of memory devices;

creating a graphical image from the identified graphical content, wherein the graphical image comprises a plurality of sub-areas, wherein each sub-area contains graphical content and corresponds to at least one memory device of the plurality of memory devices;

printing a white layer onto the plurality of memory devices; and printing the graphical image onto the plurality of memory devices, wherein the plurality of memory devices are positioned to substantially correspond with positions of the plurality of sub-areas in the graphical image.

17. The method of claim 16 further comprising printing an identifier onto the white layer of at least one memory device.

18. A memory device with a printed surface, wherein the surface is printed using the method of claim 16.

*19. The method of claim 1 further comprising obtaining the identifiers of the memory devices, each of the obtained identifiers including information about a memory device to which it corresponds, wherein the information includes one or more indicia of characteristics and/or a manufacturer of the memory device.*

*20. The method of claim 14 further comprising obtaining identifiers of the memory devices, each of the obtained identifiers including information about a memory device to which it corresponds, wherein the information includes one or more indicia of characteristics and/or a manufacturer of the memory device.*

*21. The method of claim 16 further comprising obtaining identifiers of the memory devices, each of the obtained identifiers including information about a memory device to which it corresponds, wherein the information includes one or more indicia of characteristics and/or a manufacturer of the memory device.*

*22. A method for printing graphical content onto a memory device, the method comprising:*

*obtaining an identifier of a memory device, the identifier including information about the memory device, wherein the information includes one or more indicia of characteristics and/or a manufacturer of the memory device;*

*identifying graphical content to be printed onto the memory device by selecting graphical content associated with the identifier of the memory device;*

*creating a graphical image from the identified graphical content, wherein the graphical image comprises at least one sub-area that contains the identified graphical content, wherein the memory device is positioned to substantially align with a position of the sub-area in the graphical image; and*

*printing the graphical image, wherein the identified graphical content is printed onto the memory device.*

*23. The method of claim 22, wherein each of the at least one sub-area contains a distinct graphical content, each distinct graphical content being indexed by a corresponding identifier.*

*24. The method of claim 22, wherein the graphical image is created with multiple distinct graphical contents or multiple similar graphical contents or with both similar and distinct graphical contents, with each graphical content being associated with a corresponding memory device.*

*25. The method of claim 22, wherein the graphical image is configured to be batch printed onto multiple memory devices in a mass production facility.*

*26. The method of claim 22 further comprising printing the graphical image in batch onto multiple memory devices.*

*27. The method of claim 26, wherein each memory device has a position while the graphical image is printed in batch, and wherein each position corresponds with a position of a sub-area in the graphical image.*

*28. A memory device with a printed surface, wherein the surface is printed using the method of claim 22.*

*29. A method for printing graphical content onto a plurality of memory devices, the method comprising:*

*obtaining one or more identifiers, each identifier includes information about a memory device, of a plurality of memory devices, to which it corresponds, wherein the information includes one or more indicia of characteristics and/or a manufacturer of the memory device;*

*identifying graphical content to be printed onto the plurality of memory devices, wherein the graphical content to be printed onto each of the plurality of memory devices is indexed by the one or more identifiers;*

*creating a graphical image from the identified graphical content, wherein the graphical image comprises a plurality of sub-areas, wherein each sub-area contains graphical content and corresponds to at least one memory device of the plurality of memory devices; and*

*printing the graphical image onto the plurality of memory devices, wherein the plurality of memory devices are positioned to substantially correspond with positions of the plurality of sub-areas in the graphical image.*

*30. A memory device with a printed surface, wherein the surface is printed using the method of claim 29.*

*31. A method for printing graphical content onto a plurality of memory devices, the method comprising:*

*obtaining one or more identifiers, each identifier includes information about a memory device, of a plurality of memory devices, to which it corresponds, wherein the information includes one or more indicia of characteristics and/or a manufacturer of the memory device;*

*identifying graphical content to be printed onto the plurality of memory devices, wherein the graphical content to be printed onto each of the plurality of memory devices is indexed by the one or more identifiers;*

*creating a graphical image from the identified graphical content, wherein the graphical image comprises a plurality of sub-areas, wherein each sub-area contains graphical content and corresponds to at least one memory device of the plurality of memory devices; and*

*printing the graphical image onto the plurality of memory devices, wherein the plurality of memory devices are positioned to substantially correspond with positions of the plurality of sub-areas in the graphical image,*

*wherein the plurality of memory devices are arranged in a tray, and wherein graphical content to be printed onto a given memory device is selected according to that given memory device's position in the tray.*

*32. A memory device with a printed surface, wherein the surface is printed using the method of claim 31.*

* * * * *